United States Patent
Cho et al.

(10) Patent No.: US 12,010,259 B2
(45) Date of Patent: Jun. 11, 2024

(54) ELECTRONIC DEVICE INCLUDING POSTURE SENSOR AND METHOD FOR CONTROLLING RELATIVE MOVEMENT OF PARTS THEREOF

(71) Applicant: SAMSUNG ELECTRONICS CO., LTD., Suwon-si (KR)

(72) Inventors: Hyoungtak Cho, Suwon-si (KR); Junhyuk Kim, Suwon-si (KR); Hoyoung Jeong, Suwon-si (KR); Hojin Jung, Suwon-si (KR); Yangwook Kim, Suwon-si (KR); Jihea Park, Suwon-si (KR); Myunghoon Kwak, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 158 days.

(21) Appl. No.: 17/680,207

(22) Filed: Feb. 24, 2022

(65) Prior Publication Data
US 2023/0080472 A1    Mar. 16, 2023

Related U.S. Application Data

(63) Continuation of application No. PCT/KR2021/018781, filed on Dec. 10, 2021.

(30) Foreign Application Priority Data

Sep. 10, 2021 (KR) .......... 10-2021-0121291
Nov. 3, 2021 (KR) .......... 10-2021-0149411

(51) Int. Cl.
*H04M 1/02* (2006.01)
*H04M 1/72454* (2021.01)
*H04W 52/02* (2009.01)

(52) U.S. Cl.
CPC ..... *H04M 1/72454* (2021.01); *H04M 1/0268* (2013.01); *H04W 52/027* (2013.01); *H04M 2250/12* (2013.01)

(58) Field of Classification Search
CPC .......... H04M 1/72454; H04M 1/0268; H04M 2250/12; H04M 1/0237; H04W 52/027;
(Continued)

(56) References Cited

U.S. PATENT DOCUMENTS

| 10,742,784 B1 * | 8/2020 | Jo ........................ H04M 1/0237 |
| 2005/0124398 A1 * | 6/2005 | Lee ..................... H04M 1/0237 |
| | | 455/566 |

(Continued)

FOREIGN PATENT DOCUMENTS

| JP | 2004007135 | * | 1/2004 |
| JP | 2014-010597 A | | 1/2014 |

(Continued)

OTHER PUBLICATIONS

PCT International Search Report dated Jun. 7, 2022 for PCT/KR2021/018781.
PCT Written Opinion dated Jun. 7, 2022 for PCT/KR2021/018781.

*Primary Examiner* — Angelica Perez
(74) *Attorney, Agent, or Firm* — NIXON & VANDERHYE P.C.

(57) ABSTRACT

An electronic device includes an extendable support including a first structure and a second structure to receive at least a portion of the first structure and guide relative movement of the first structure with respect to the second structure, a display having compact and expanded positions based on the relative movement of the first structure, a motor to generate an output force to cause the relative movement of the first and second structures, a sensor to detect a posture in which the electronic device is positioned, and a processor to change (Continued)

the output force of the motor based on the posture of the electronic device detected by the sensor.

20 Claims, 16 Drawing Sheets

(58) Field of Classification Search
CPC ........... G06F 2200/1637; G06F 1/1624; G06F 1/1652; G06F 1/1677; G06F 1/3265; G06F 3/04883
See application file for complete search history.

(56) References Cited

U.S. PATENT DOCUMENTS

2010/0271769 A1* 10/2010 Rema Shanmugam ..................... H04M 1/0237
361/679.05
2018/0228036 A1   8/2018   Mou et al.
2019/0216285 A1   7/2019   Jang et al.
2022/0005392 A1   1/2022   Lee et al.

FOREIGN PATENT DOCUMENTS

| KR | 2017008610 | * | 1/2017 |
| KR | 10-2018-0008250 | | 1/2018 |
| KR | 10-2019-0122021 A | | 10/2019 |
| KR | 10-2066569 B1 | | 1/2020 |
| KR | 10-2020-0111519 A | | 9/2020 |
| KR | 10-2020-0124989 A | | 11/2020 |
| KR | 10-2020-0127094 A | | 11/2020 |
| KR | 10-2020-0140582 A | | 12/2020 |
| KR | 10-2288812 B1 | | 8/2021 |
| KR | 102288812 | * | 8/2021 |

* cited by examiner

ELECTRONIC DEVICE INCLUDING POSTURE SENSOR AND METHOD FOR CONTROLLING RELATIVE MOVEMENT OF PARTS THEREOF

CROSS REFERENCE TO RELATED APPLICATIONS

This application is a Bypass Continuation of International Patent Application No. PCT/KR2021/018781, filed on Dec. 10, 2021, which claims priority from and the benefit of Korean Patent Application Nos. 10-2021-0121291, filed on Sep. 10, 2021, and 10-2021-0149411, filed on Nov. 3, 2021, each of which is hereby incorporated by reference for all purposes as if fully set forth herein.

BACKGROUND

Field

Illustrative embodiments of the disclosure relate generally to electronic devices and, more particularly, to electronic devices including a sensor to detect a posture of the electronic devices.

Discussion of the Background

With the development of information and communication technology and semiconductor technology, various functions are being integrated into one portable electronic device. For example, an electronic device may implement not only communication functions but also entertainment functions, such as playing games, multimedia functions, such as playing music and videos, communication and security functions for mobile banking, and scheduling and e-wallet functions. Such electronic devices have become compact enough for users to carry in a convenient way.

As mobile communication services extend up to multimedia service sectors, electronic devices require a larger display to allow users satisfactory use of multimedia services as well as voice call or text messaging services. Increasing the size of the display, however, requires a trade-off that is contrary to the trend of electronic devices being compact.

An electronic device such as a portable terminal includes a display with a generally flat surface or both flat and curved surfaces. The size of the electronic device limits the size of the electronic display to the size of the electronic device due to the fixed display structure. Accordingly, research has been conducted on electronic devices including a rollable display. Electronic devices including a rollable display may include a driving module such as a motor to automatically slide a support plate of the display to roll or unroll the display.

The above information disclosed in this Background section is only for understanding of the background of the inventive concepts, and therefore, it may contain information that does not constitute prior art.

SUMMARY

Applicant discovered that the driving force required for the movement of the support plate in rollable display devices varies based upon the position of the display. For example, the electronic device may be positioned in a variety of postures, and the driving force may be varied according to the posture of the electronic device based upon the weight of the components.

Electronic devices constructed according to the principles and illustrative embodiments of the disclosure are capable of efficiently using current to drive movement of the electronic devices. For example, the electronic device may include a sensor to detect the posture of the electronic device with respect to a ground surface, and may change an output force, which is converted into a driving force to expand or contract the display, based on the detected posture of the electronic device. Accordingly, the consumption of the current for generating the driving force may be reduced.

Additional features of the inventive concepts will be set forth in the description which follows, and in part will be apparent from the description, or may be learned by practice of the inventive concepts.

According to one aspect of the disclosure, an electronic device includes: an extendable support including a first structure and a second structure to receive at least a portion of the first structure and guide relative movement of the first structure with respect to the second structure; a display, at least a portion of which is configured to be rolled based on the relative movement of the first structure; a motor to generate an output force to cause the relative movement of the first and second structures; a sensor to detect a posture in which the electronic device is positioned; and a processor to change the output force of the motor based on the posture of the electronic device detected by the sensor.

The sensor may include a posture detection sensor including i) at least one of an acceleration sensor and a gyro sensor, or ii) at least one of a geomagnetic sensor or a pressure sensor.

The relative movement may include linear movement and the processor may configured to determine a first angle between a direction of the linear movement and a ground surface using the sensor and to control an input current or an input voltage transferred to the motor based on the first angle to change the output force of the motor.

The motor may be disposed in the first structure and the electronic device may further include a gear assembly connected to the motor and including a pinion gear disposed in the first structure and a rack gear connected to the second structure.

The processor may be configured to determine a driving force necessary to effect the relative movement of the first and second structures based on the posture detected using the sensor. The output force may be set to be larger than the driving force.

The output force may be set to be larger than the driving force by a substantially uniform designated value, and the output force may be adjustable in real time based on the posture.

The processor may be configured to substantially uniformly control the output force within at least one of designated ranges of the posture, and the output force may be adjustable stepwise in the designated ranges.

The sensor may include a distance detection sensor to detect the relative movement. The processor may be configured to determine the driving force at a point where the relative movement starts using the distance detection sensor and control the output force to be larger than the driving force by a designated value and uniform within one of the designated ranges.

The processor may include a motor driver driving circuit to adjust an operation of the motor.

The processor may be configured to adjust torque of the motor while controlling the motor to maintain substantially the same rotation speed.

The electronic device may further include a battery to supply power to the motor and the processor. The processor may be configured to output, using the display, a guide message for changing the posture of the electronic device when a state of charge of the battery is less than a designated level.

The processor may be configured to generate signals to: before moving the first structure into the second structure, output a first guide message to allow the second structure to be positioned further adjacent to a ground surface than the first structure and rotate the electronic device to allow a direction of the relative movement to be substantially perpendicular to the ground surface; and before moving the first structure out of the second structure, output a second guide message to allow the first structure to be positioned further adjacent to the ground surface than the second structure and rotate the electronic device to allow the direction of the relative movement to be substantially perpendicular to the ground surface.

The processor may be configured to output, using the display, at least one guide message to induce rotation of the electronic device to increase accuracy of the sensor of the electronic device.

The extendable support may include a housing and the first structure includes a slide housing and the second structure includes a main housing. The display may include a rollable display configured to be rolled or unrolled into the compact or expanded positions.

The electronic device may further include a multi-bar structure supporting at least a portion of the display.

According to another aspect of the disclosure, a method for controlling relative movement of parts of an electronic device includes the steps of: detecting a posture of the electronic device using a sensor; and changing an output force of a motor causing a movement of one portion of the electronic device relative to another portion of the electronic device based on the detected posture.

The movement may include relative linear movement and the step of detecting the posture may include determining a first angle between a direction of the linear movement and a ground surface using the sensor. The step of changing the output force may include changing an input current or an input voltage transferred to the motor based on the first angle to change the output force.

The step of changing the output force may include the steps of determining a driving force necessary to move the one portion based on the posture detected using the sensor, and adjusting the output force to be larger than the driving force.

The method may further include detecting a slide trigger event of the electronic device.

The step of changing the output force may include at least one of i) controlling the output force to be substantially uniform within a designated range of the detected posture, and ii) changing the output force stepwise in the designated range.

It is to be understood that both the foregoing general description and the following detailed description are illustrative and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate illustrative embodiments of the disclosure, and together with the description serve to explain the inventive concepts.

DETAILED DESCRIPTION

Figure 1:
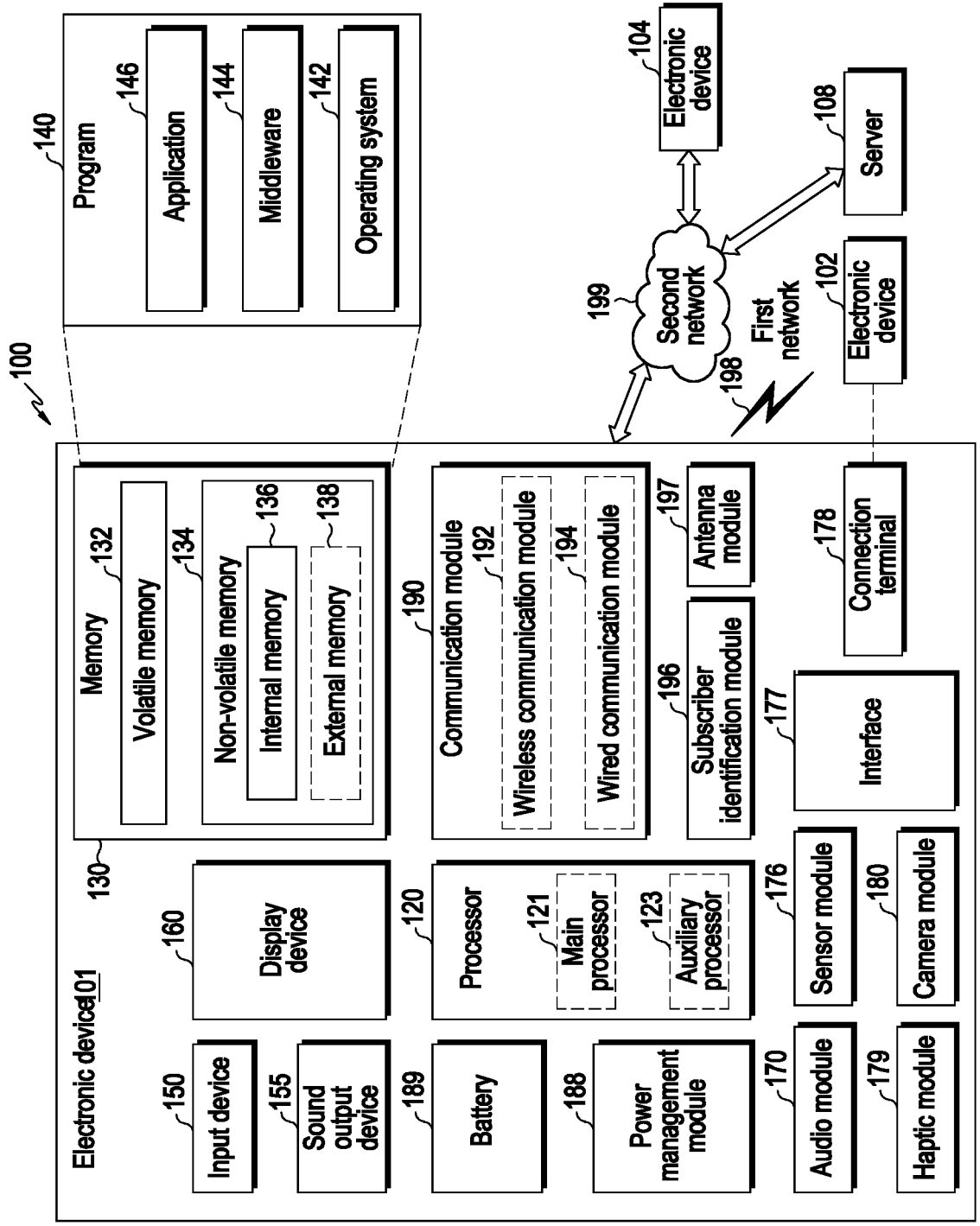
FIG. 1 is a block diagram illustrating an embodiment of an electronic device constructed according to the principles of the disclosure in a network environment.

In the following description, for the purposes of explanation, numerous specific details are set forth in order to provide a thorough understanding of various illustrative embodiments or implementations of the disclosure. As used herein "embodiments" and "implementations" are interchangeable words that are non-limiting examples of devices or methods employing one or more of the inventive concepts disclosed herein. It is apparent, however, that various illustrative embodiments may be practiced without these specific details or with one or more equivalent arrangements. In other instances, well-known structures and devices are shown in block diagram form in order to avoid unnecessarily obscuring various illustrative embodiments. Further, various illustrative embodiments may be different, but do not have to be exclusive. For example, specific shapes, configurations, and characteristics of an illustrative embodiment may be used or implemented in another illustrative embodiment without departing from the inventive concepts.

Unless otherwise specified, the illustrated illustrative embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an illustrative embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various illustrative embodiments are described herein with reference to sectional and/or exploded illustrations that are schematic illustrations of idealized illustrative embodiments and/or intermediate structures. As such, variations from the shapes of the illustrations as a result, for example, of manufacturing techniques and/or tolerances, are to be expected. Thus, illustrative embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some illustrative embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some illustrative embodiments may be physically separated into two or more interacting and discrete blocks, units, and/or modules without departing from the scope of the inventive concepts. Further, the blocks, units, and/or modules of some illustrative embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating an embodiment of an electronic device constructed according to the principles of the disclosure in a network environment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
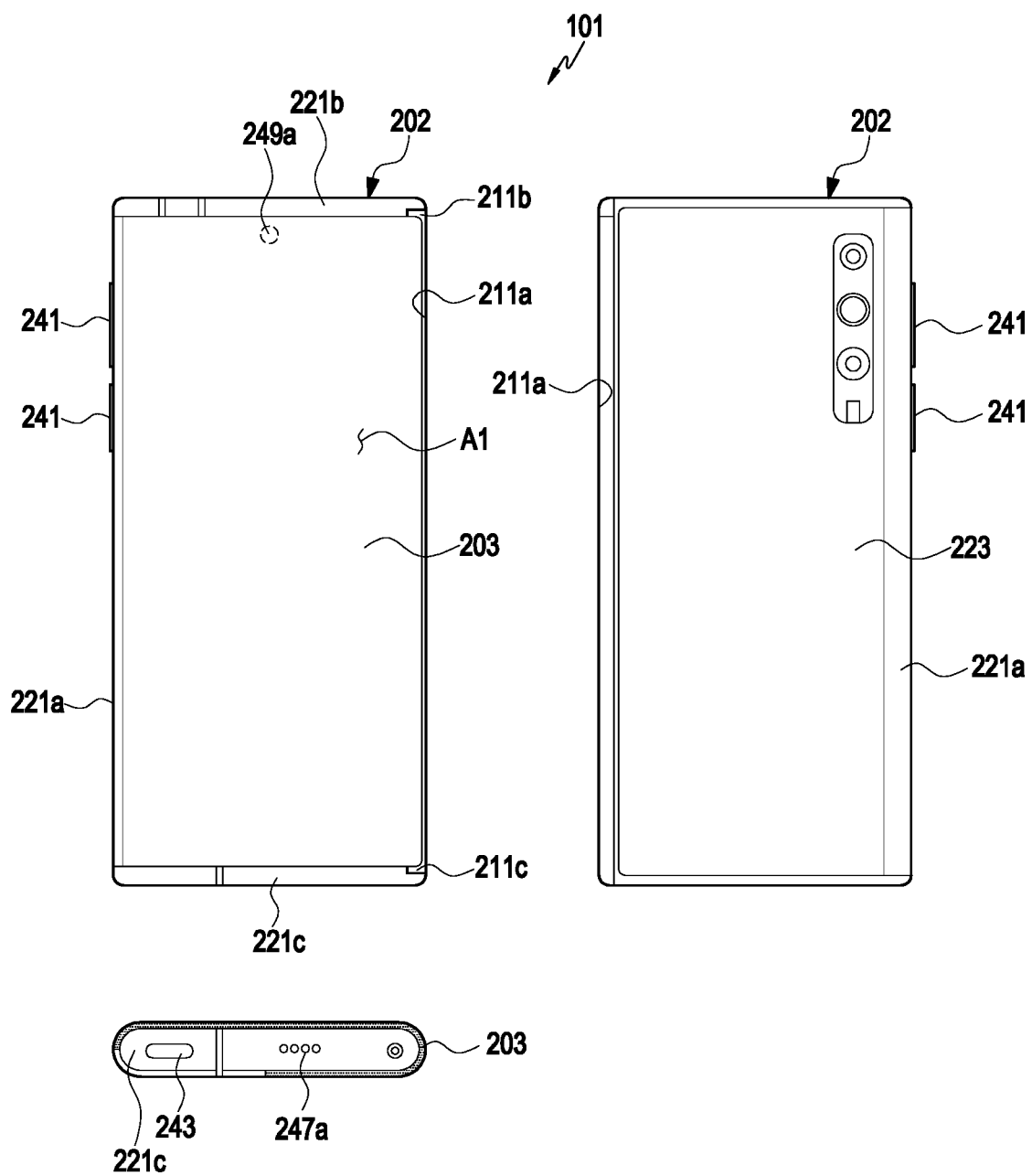
FIG. 2 shows front, rear, and side views of an embodiment of the electronic device constructed according to the principles of the disclosure in a compact position.
Figure 3:
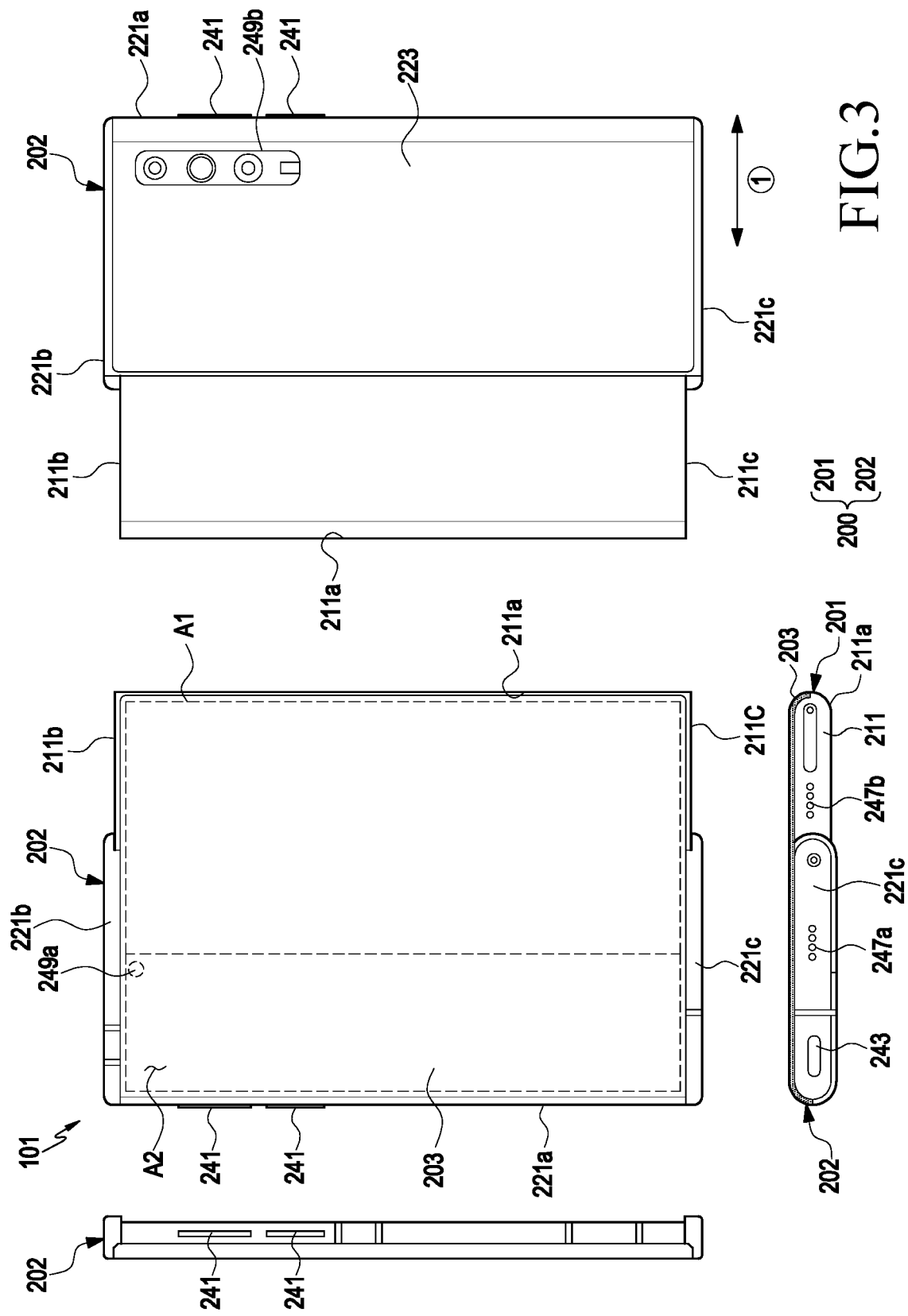
FIG. 3 is front, rear, and side views of the electronic device of FIG. 2 in an expanded position.

FIG. 2 shows front, rear, and side views of an embodiment of the electronic device constructed according to the principles of the disclosure in a compact position. FIG. 3 is front, rear, and side views of the electronic device of FIG. 2 in an expanded position. For example, FIG. 2 is a view illustrating a first position in which a second display area A2 is received in a second housing 202. FIG. 3 is a view illustrating a second position in which at least a portion of the second display area A2 is visually exposed to the outside of the second housing 202.

The first position shown in FIG. 2 may be denoted as a first housing 201 sliding into the second housing 202 to receive the second display area A2 in the second housing 202. The second position shown in FIG. 3 may be denoted as the first housing 201 sliding out of the second housing 202 to expose the second display area A2. The first position and the second position may be defined as a compact position (e.g., closed state) and an expanded position (e.g., open state), respectively.

Referring to FIGS. 2 and 3, an electronic device 101 may be a display device including a display 203 to provide visual information The electronic device 101 may include an extendable support, which is in the form of a housing 200 including the second housing 202 and the first housing 201 that is movable with respect to the second housing 202. According to an embodiment, the electronic device 101 may have a structure in which the second housing 202 is supported for movement, e.g., linear movement by being slidably disposed on the first housing 201. According to an embodiment, the first housing 201 may be slidably engaged with the second housing 202 to perform reciprocating linear motion by a predetermined distance in a predetermined direction with respect to the second housing 202, for example, a direction indicated by an arrow ①. The configuration of the electronic device 101 of FIGS. 2 and 3 may be identical in whole or part to the configuration of the electronic device 101 of FIG. 1.

According to an embodiment, the first housing 201 may be in the form of a first structure, such as a slide part, or a slide housing, and may be supported for reciprocal linear motion by the second housing 202. According to an embodiment, the second housing 202 may be in the form of a second structure, such as a main part, or a main housing. The second housing 202 may receive at least a portion of the first housing 201 and may guide linear movement such as the sliding movement of the first housing 201. According to an embodiment, the second housing 202 may receive various electrical and electronic components, such as a main circuit board or a battery. According to an embodiment, at least a portion (e.g., the first display area A1) of the display 203 may be visually exposed to the outside of the housing 200. According to an embodiment, another portion (e.g., the second display area A2) of the display 203 may be received within the inside of the second housing 202 in a slide-in movement (or motion) or be visually exposed to the outside of the second housing 202 in a slide-out movement (or motion) as the first housing 201 moves (e.g., slides) with respect to the second housing 202. According to an embodiment, a motor, a speaker, a sim socket, and/or a sub circuit board electrically connected with a main circuit board may be disposed in the first housing 201. A main circuit board on which electrical components, such as an application processor (AP) and a communication processor (CP) are mounted may be disposed in the second housing 202.

According to various embodiments, the first housing 201 may include a first plate 211 (e.g., a slide plate). According to an embodiment, the first plate 211 may support at least a portion of the display 203 (e.g., the first display area A1). According to an embodiment, the first plate 211 may include first sidewalls 211a, 211b, and 211c for surrounding at least a portion of the display 203 and/or the multi-bar structure (e.g., the multi-bar structure 213 of FIG. 4). According to an embodiment, the first sidewalls 211a, 211b, and 211c may extend from the first plate 211. The first sidewalls 211a, 211b, and 211c may include a 1-2th sidewall 211b, a 1-3th sidewall 211c opposite to the 1-2th sidewall 211b, and a 1-1th sidewall 211a extending from the 1-2th sidewall 211b to the 1-3th sidewall 211c. According to an embodiment, the 1-1th sidewall 211a may be substantially perpendicular to the 1-2th sidewall 211b and/or the 1-3th sidewall 211c. According to an embodiment, in the compact position (e.g., FIG. 2) of the electronic device 101, the 1-2th sidewall 211b may face the 2-2th sidewall 221b of the second housing 202, and the 1-3th sidewall 211c may face the 2-3th sidewall 221c of the second housing 202. According to an embodiment, the first plate 211, the 1-1th sidewall 211a, the 1-2th sidewall 211b, and/or the 1-3th sidewall 211c may be integrally formed. According to another embodiment, the first plate 211, the 1-1th sidewall 211a, the 1-2th sidewall 211b, and/or the 1-3th sidewall 211c may be formed as separate housings and be combined or assembled.

According to various embodiments, the second housing 202 may include second sidewalls 221a, 221b, and 221c to surround at least a portion of the first housing 201. According to an embodiment, the second sidewalls 221a, 221b, and 221c may extend from the second plate 221 and/or the second supporting member 222. According to an embodiment, the second sidewalls 221a, 221b, and 221c may include a 2-2th sidewall 221b, a 2-3th sidewall 221c opposite to the 2-2th sidewall 221b, and a 2-1th sidewall 221a extending from the 2-2th sidewall 221b to the 2-3th sidewall 221c. According to an embodiment, the 2-1th sidewall 221a may be substantially perpendicular to the 2-2th sidewall 221b and/or the 2-3th sidewall 221c. According to an embodiment, the 2-2th sidewall 221b may face the 1-2th sidewall 211b, and the 2-3th sidewall 221c may face the 1-3th sidewall 211c. For example, in the compact position (e.g., FIG. 2) of the electronic device 101, the 2-2th sidewall 221b may cover at least a portion of the 1-2th sidewall 211b, and the 2-3th sidewall 221c may cover at least a portion of the 1-3th sidewall 211c.

According to various embodiments, the second housing 202 may be open at one side (e.g., a front face) to receive (or surround) at least a portion of the second housing 201. For example, the first housing 201 may be connected to the second housing 202 while being at least partially surrounded by the 2-1th sidewall 221a, the 2-2th sidewall 221b, and the 2-3th sidewall 221c and may be slid in the direction of arrow ① while being linearly guided by the second housing 202. According to an embodiment, the cover member (e.g., the cover member 222 of FIG. 4), the 2-1th sidewall 221a, the 2-2th sidewall 221b, and/or the 2-3th sidewall 221c may be formed integrally. According to another embodiment, the second cover member 222, the 2-1th sidewall 221a, the 2-2th sidewall 221b, and/or the 2-3th sidewall 221c may be formed as separate housings and be combined or assembled.

According to various embodiments, the second housing 202 may include a rear plate 223. According to an embodiment, the rear plate 223 may form at least a portion of the exterior of the electronic device 101. For example, the rear plate 223 may provide a decorative effect on the exterior of the electronic device 101.

According to various embodiments, the cover member 222 and/or the 2-1th sidewall 221a may cover at least a portion of the display 203. For example, at least a portion of the display 203 (e.g., the second display area A2) may be received in the second housing 202, and the cover member 222 and/or the 2-1th sidewall 221a may cover a portion of the display 203 received in the second housing 202.

According to various embodiments, the electronic device 101 may include a display 203. For example, the display 203 may be a flexible display or a rollable display. According to an embodiment, at least a portion of the display 203 (e.g., the second display area A2) may slide based on the linear movement of the first housing 201. According to an embodiment, the display 203 may include, or be disposed adjacent to, a touch detection circuit, a pressure sensor capable of measuring the intensity (pressure) of a touch, and/or a digitizer that detects a magnetic field-type stylus pen. The configuration of the display 203 of FIGS. 2 and 3 may be identical in whole or part to the configuration of the display module 160 of FIG. 1.

According to various embodiments, the display 203 may include a first display area A1 and a second display area A2. According to an embodiment, the first display area A1 may be an area that is always visible from the outside. According to an embodiment, the first display area A1 may be an area that cannot be positioned inside the housing 202. According to an embodiment, the second display area A2 may extend from the first display area A1, and the second display area A2 may be inserted or received in, or visually exposed to the outside of, the second housing 202 as the first housing 201 slides. According to an embodiment, the first display area A1 may be seated on a portion (e.g., the first plate 211) of the first housing 201.

According to various embodiments, the second display area A2 may be substantially moved while being guided by the multi-bar structure (e.g., the multi-bar structure 213 of FIG. 4) mounted in the first housing 201 and may be thus received in, or visually exposed to the outside of, the second housing 202 and/or a space formed between the first housing 201 and the second housing 202. According to an embodiment, the second display area A2 may be moved based on the linear movement of the first housing 201 in the width direction (e.g., the direction indicated by the arrow ①). For example, at least a portion of the second display area A2 may be unrolled or rolled together with the multi-bar structure 213 based on the slide movement of the first housing 201.

According to various embodiments, when viewed from above the first housing 201, when the first housing 201 moves out of the second housing 202 from the compact (e.g., closed state) to expanded position (e.g., open state), the second display area A2 may be gradually exposed to the outside of the housing 202 to be substantially coplanar with the first display area A1. In an embodiment, the second display area A2 may be at least partially received in the first housing 201 and/or the second housing 202.

According to various embodiments, the electronic device 101 may include at least one key input device 241, a connector hole 243, audio modules 247a and 247b, or camera modules 249a and 249b. The electronic device 101 may further include an indicator (e.g., a light emitting diode (LED) device) or various sensor modules. The configuration of the audio module 247a and 247b and camera modules 249a and 249b of FIGS. 2 and 3 may be identical in whole or part to the configuration of the audio module 170 and the camera module 180 of FIG. 1.

According to various embodiments, the key input device 241 may be positioned in one area of the first housing 201. Depending on the appearance and the state of use, the electronic device 101 may be designed to omit the illustrated key input device 241 or to include additional key input device(s). According to an embodiment, the electronic device 101 may include a key input device such as a home key button and/or a touchpad disposed around the home key button. According to another embodiment, at least a portion of the key input device 241 may be disposed on the second housing 202.

According to various embodiments, the connector hole 243 may be omitted or may receive a connector (e.g., a universal serial bus (USB) connector) for transmitting and receiving power and/or data with an external electronic device. The electronic device 101 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 221c, but embodiments are not limited thereto. The connector hole 243 or other necessary connector hole may be disposed in the 2-1th sidewall 221a or the 2-2th sidewall 221b.

According to various embodiments, the audio modules 247a and 247b may include at least one speaker hole 247a and 247b or at least one microphone hole. At least one of the speaker holes 247a and 247b may be provided as an external speaker hole. At least one of the speaker holes 247a and 247b may be provided as a receiver hole for voice call. The electronic device 101 may include a microphone for obtaining sound. The microphone may obtain external sound of the electronic device 101 through the microphone hole. According to an embodiment, the electronic device 101 may include a plurality of microphones to detect the direction of sound. According to an embodiment, the electronic device 101 may include an audio module in which the speaker holes 247a and 247b and the microphone hole are implemented as one hole or may include a speaker without the speaker hole 247a (e.g., a piezo speaker).

According to various embodiments, the camera modules 249a and 249b may include a first camera module 249a and/or a second camera module 249b. The second camera module 249b may be positioned in the second housing 202 and may capture a subject in a direction opposite to the first display area A1 of the display 203. The electronic device 101 may include a plurality of camera modules 249a and 249b. For example, the electronic device 101 may include at least one of a wide-angle camera, a telephoto camera, or a close-up camera. According to an embodiment, the electronic device 200 may measure the distance to the subject by including an infrared projector and/or an infrared receiver. The camera modules 249a and 249b may include one or more lenses, an image sensor, and/or an image signal processor. The electronic device 101 may further include another camera module (first camera module 249a, e.g., a front camera) that captures a subject in a direction opposite to the second camera module 249b. For example, the first camera module 249a may be disposed around the first display area A1 or in an area overlapping the first display area A1. If disposed in an area overlapping the display 203, the first camera module 249a may capture the subject through the display 203.

According to various embodiments, an indicator (e.g., an LED device) of the electronic device 101 may be disposed on the first housing 201 and/or the second housing 202, and the indicator may include a light emitting diode to provide state information about the electronic device 101 as a visual signal. The sensor module (e.g., the sensor module 176 of FIG. 1) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). In another embodiment, the electronic device 101 may include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor. The configuration of the display 203, audio module 247a and 247b, and camera module 249a and 249b of FIGS. 2A and 2B may be identical in whole or part to the configuration of the display module 160, the audio module 170, and the camera module 180 of FIG. 1.

Figure 4:
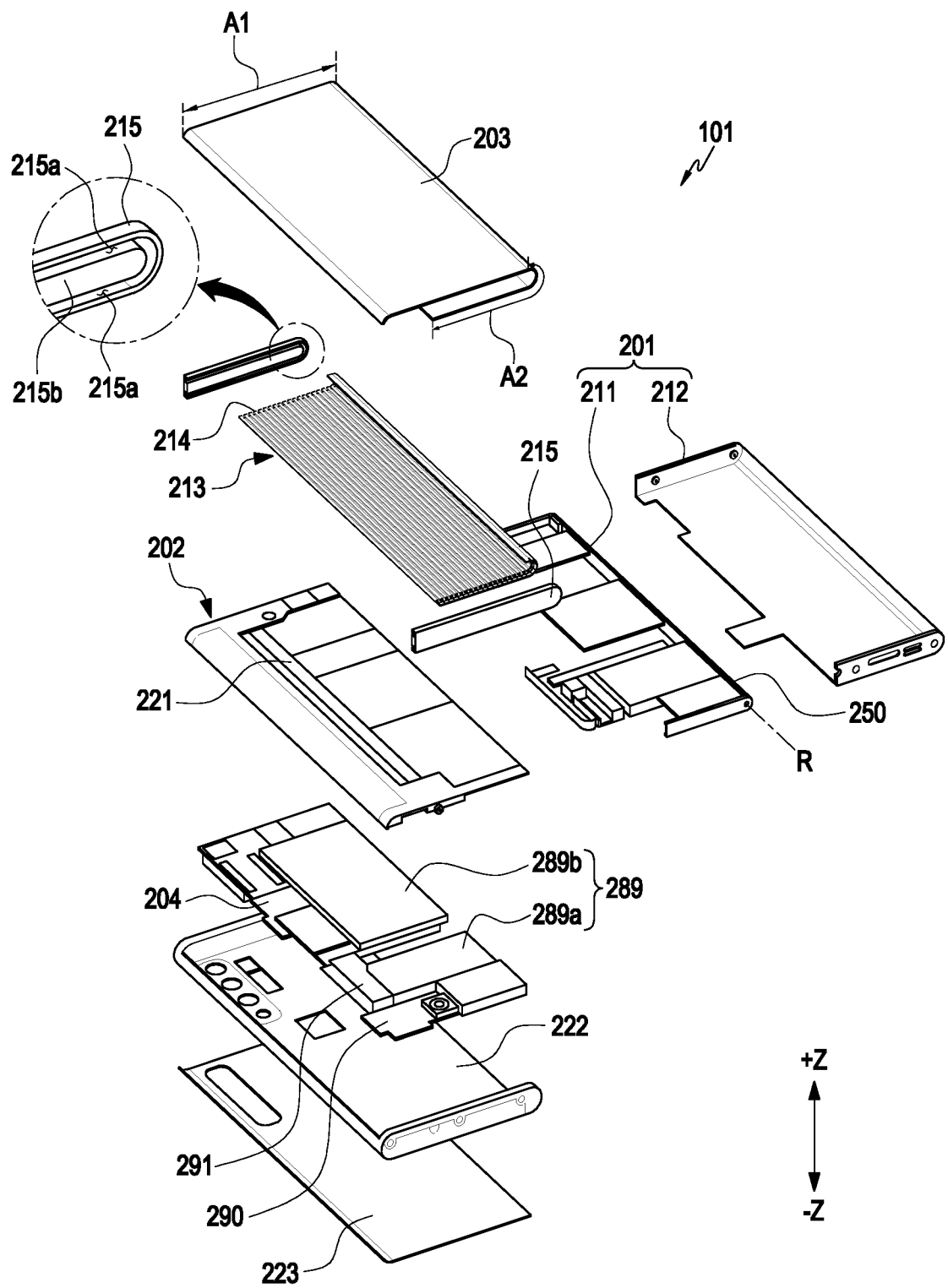
FIG. 4 is an exploded perspective view of the electronic device of FIG. 2.

FIG. 4 is an exploded perspective view of the electronic device of FIG. 2.

Referring to FIG. 4, an electronic device 101 may include a first housing 201, a second housing 202, a display 203, and a multi-bar structure 213. A portion (e.g., the second display area A2) of the display 203 may be received in the electronic device 101 while being guided by the multi-bar structure 213. The configuration of the first housing 201, the second housing 202, and the display 203 of FIG. 4 may be identical in whole or part to the configuration of the first housing 201, the second housing 202, and the display 203 of FIGS. 2 and/or 3.

According to various embodiments, the first housing 201 may include a first plate 211 and a slide cover 212. The first plate 211 and the slide cover 212 may linearly reciprocate in one direction (e.g., the direction of arrow ① in FIG. 1) while being guided by the second housing 202. According to an embodiment, the first plate 211, along with the slide cover 212, may slide with respect to the second housing 202. For example, at least a portion of the display 203 and/or at least a portion of the multi-bar structure 213 may be disposed between the first plate 211 and the slide cover 212.

According to an embodiment, the first plate 211 may support at least a portion of the display 203 (e.g., the second display area A2). For example, the first plate 211 may include a curved surface 250. The second display area A2 of the display 203 may be positioned on the curved surface 250. According to an embodiment, the first plate 211 may be a display support bar (DSB).

According to an embodiment, the slide cover 212 may protect the display 203 positioned on the first plate 211. For example, at least a portion of the display 203 may be positioned between the first plate 211 and the slide cover 212. According to an embodiment, the first plate 211 and the slide cover 212 may be formed of a metal material and/or a non-metal (e.g., polymer) material.

According to various embodiments, the first housing 201 may include a guide rail 215. According to an embodiment, the guide rail 215 may be connected to the first plate 211 and/or the slide cover 212. For example, the guide rail 215, along with the first plate 211 and the second slide cover 212, may slide with respect to the second housing 202.

According to various embodiments, the electronic device 101 may include a multi-bar structure 213. According to an embodiment, the multi-bar structure 213 may support the display 203. For example, the multi-bar structure 213 may be connected with the display 203. According to an embodiment, at least a portion of the display 203 and the multi-bar structure 213 may be positioned between the first plate 211 and the slide cover 212. According to an embodiment, as the first housing 201 slides, the multi-bar structure 213 may move with respect to the second housing 202. In the compact position shown in FIG. 2A, most of the structure of the multi-bar structure 213 may be received in the second housing 202. According to an embodiment, at least a portion of the multi-bar structure 213 may move corresponding to the curved surface 250 positioned at the edge of the first plate 211.

According to various embodiments, the multi-bar structure 213 may include a plurality of bars 214 (or rods). The plurality of rods 214 may extend in a straight line and be disposed parallel to the rotational axis R formed by the curved surface 250, and the plurality of rods 214 may be arranged along a direction perpendicular to the rotational axis R (e.g., the direction along which the first housing 201 slides).

According to various embodiments, each rod 214 may pivot around another adjacent rod 214 while remaining parallel with the other adjacent rod 214. According to an embodiment, as the first housing 201 slides, the plurality of rods 214 may be arranged to form a curved shape or may be arranged to form a planar shape. For example, as the first housing 201 slides, a portion of the multi-bar structure 213 facing the curved surface 250 may form a curved surface, and another portion of the multi-bar structure 213 that does not face the curved surface 250 may form a flat surface. According to an embodiment, the second display area A2 of the display 203 may be mounted or supported on the multi-bar structure 213, and in the expanded position (e.g., FIG. 3), at least a portion of the second display area A2, along with the first display area A1, may be exposed to the outside of the second housing 202. In the expanded position in which the second display area A2 is exposed to the outside of the second housing 202, the multi-bar structure 213 may form a substantially flat surface, thereby supporting or maintaining the second display area A2 in a substantially flat state. According to an embodiment, the multi-bar structure 213 may be replaced with a bendable integral supporting member. According to an embodiment, the multi-bar structure 213 may be a display supporting multi-bar or articulated hinge structure.

According to various embodiments, the guide rail 215 may guide the movement of the plurality of rods 214. According to an embodiment, the guide rail 215 may include an upper guide rail adjacent to the 1-2th sidewall (e.g., the 1-2th sidewall 211b in FIG. 3) and a lower guide rail adjacent to the 1-3th sidewall (e.g., the 1-3th sidewall 211c). According to an embodiment, the guide rail 215 may include a groove-shaped rail 215a formed inside the guide rail 215 and a protrusion 215b positioned inside the guide rail. At least a portion of the protrusion 215b may be surrounded by the rail 215a. According to an embodiment, the multi-bar structure 213 may be positioned between the upper guide rail and the lower guide rail and may move while remaining engaged with the upper and lower guide rails. For example, upper and/or lower portions of the plurality of rods 214 may slide along the rail 215a while fitted into the rail 215a.

According to an embodiment, when the electronic device 101 performs the slide-out movement (or operation) to expand and open the device, the size of the area where the display 203 is exposed to the outside may be increased. For example, by driving the motor module (e.g., the motor module 310 of FIG. 5) and/or by an external force provided by the user, the first plate 211 may be slid out, and the protrusion 215b inside the guide rail 215 may push out the upper and/or lower ends of the plurality of rods 214. Accordingly, the display 203 received between the first plate 211 and the slide cover 212 may be expanded to the front.

According to an embodiment, when the electronic device 101 performs the slide-in movement (or operation) to compact or close the device, the size of the area where the display 203 is exposed to the outside may be reduced. For example, by driving the motor (e.g., the motor module 310 of FIG. 5) and/or by an external force provided by the user, the first plate 211 may be slid in, and the outer portion (e.g., a portion other than the protrusion 215b) of the guide rail 215 may push out the upper and/or lower ends of the plurality of rods 214. Accordingly, the expanded display 203 may be received between the first plate 211 and the slide cover 212.

According to various embodiments, the second housing 202 may include a second plate 221, a cover member 222, and a rear plate 223. According to an embodiment, the second plate 221 may support at least a portion (e.g., the first display area A1) of the display 203. The first plate 221 may be disposed between the display 203 and the circuit board 204. According to an embodiment, the cover member 222 may receive other components of the electronic device 101 such as the battery 289 and the circuit board 204 and may protect the components of the electronic device 101. According to an embodiment, the cover member 222 may be referred to as a book cover.

According to various embodiments, a plurality of circuit boards may be received in the second housing 202. A processor, memory, and/or interface may be mounted on the circuit board 204 which is the main board. The processor may include one or more of, e.g., a central processing unit, an application processor, a graphic processing device, an image signal processing, a sensor hub processor, or a communication processor. According to various embodiments, the circuit board 204 may include a flexible printed circuit board type radio frequency cable (FRC). For example, the circuit board 204 may be disposed in the cover member 222 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the electronic device 101 may further include a separate sub circuit board 290 spaced apart from the circuit board 240 in the second housing 202. The sub circuit board 290 may be electrically connected with the circuit board 240 through the flexible circuit board 291. The sub circuit board 290 may be electrically connected with electrical components disposed in an end area of the electronic device, such as the battery 289 or a speaker and/or a sim socket, and may transfer signals and power.

According to an embodiment, the battery 289 may be a device for supplying power to at least one component of the electronic device 101. The battery 189 may include, e.g., a primary cell which is not rechargeable, a secondary cell which is rechargeable, or a fuel cell. At least a portion of the battery 289 may be disposed on substantially the same plane as the circuit board 204. The battery 289 may be integrally or detachably disposed inside the electronic device 101.

According to various embodiments, the battery 289 may be formed as a single embedded battery or may include a plurality of removable batteries such as the first battery 289*a* and the second battery 289*b*. According to an embodiment, when the embedded battery is positioned on the first plate 211, the embedded battery may move as the first plate 211 slides. According to an embodiment, when the embedded battery is positioned on the second plate 221, the embedded battery may be fixedly disposed on the second plate 221, regardless of the sliding movement of the first plate 211. As another example, when the first battery 289*a* of the removable batteries is positioned on the first plate 211, and the second battery 289*b* of the removable batteries is fixedly positioned on the second plate 221, only the first battery 289*a* may move as the first plate 211 slides.

According to various embodiments, the rear plate 223 may substantially form at least a portion of the exterior of the second housing 202 or the electronic device 101. For example, the rear plate 223 may be coupled to the outer surface of the cover member 222. According to an embodiment, the rear plate 223 may be integrally formed with the cover member 222. According to an embodiment, the rear plate 223 may provide a decorative effect on the exterior of the electronic device 101. The second plate 221 and the cover member 222 may be formed of at least one of a metal or a polymer, and the rear plate 223 may be formed of at least one of metal, glass, synthetic resin or ceramic. According to an embodiment, the second plate 221, the cover member 222 and/or the rear plate 223 may be formed of a material that transmits light at least partially such that, in the compact position, the electronic device 101 may output visual information using an auxiliary display area such as the second display area A2 received in the second housing 202. The auxiliary display area may face downwards and overlap a portion of the second plate 221, the cover member 222, and/or the rear plate 223 in an area in which the display 203 received in the second housing 202 is positioned.

The electronic device 101 disclosed in FIGS. 2 to 4 has a rollable or slidable appearance but embodiments are not limited thereto. According to an embodiment, at least a portion of the illustrated electronic device may be rolled up in a scroll shape.

Referring to FIGS. 2 to 4, when viewed from the front of the electronic device 101, the display 203 may expand to the right of the electronic device 101. However, the structure of the electronic device 101 is not limited thereto. For example, according to an embodiment, the display 203 may expand to the left of the electronic device 101.

Figure 5:
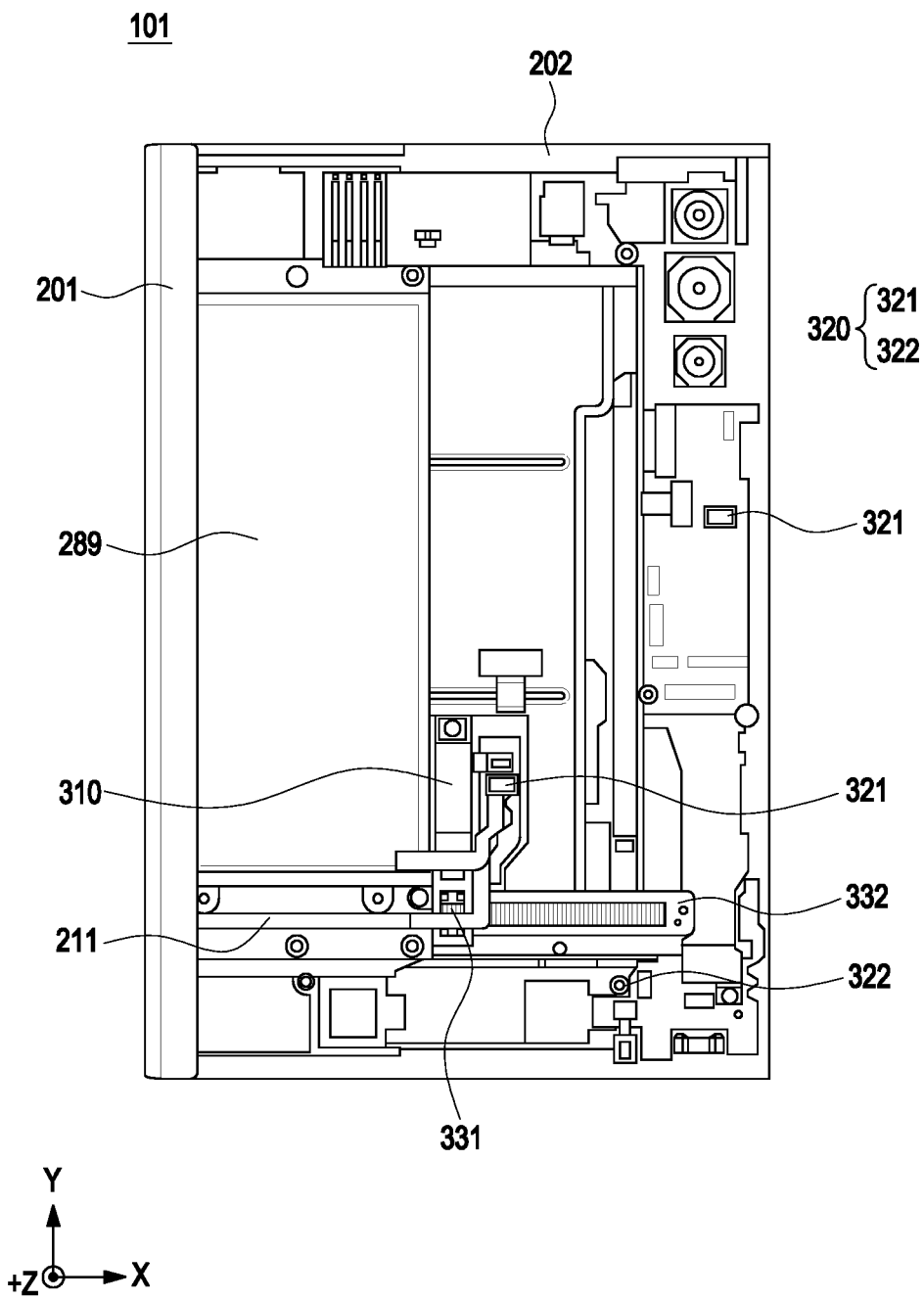
FIG. 5 is a front view of the electronic device of FIG. 2 illustrating certain elements disposed below a display constructed according to the principles of the disclosure.
Figure 6A:
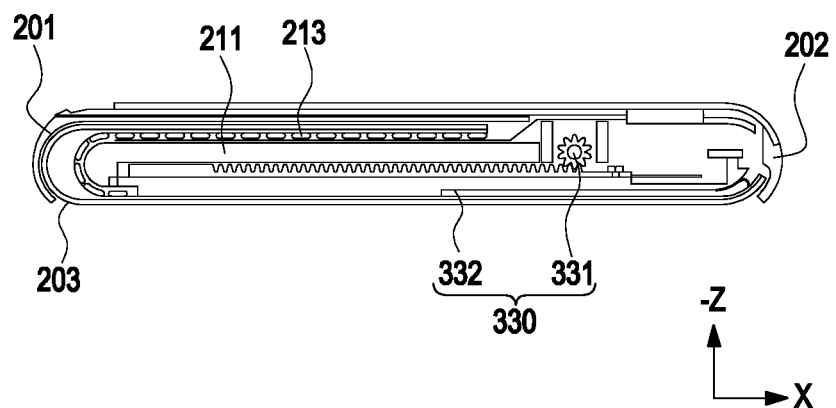
FIG. 6A is a cross-sectional view of the electronic device of FIG. 2 in a compact position.
Figure 6B:
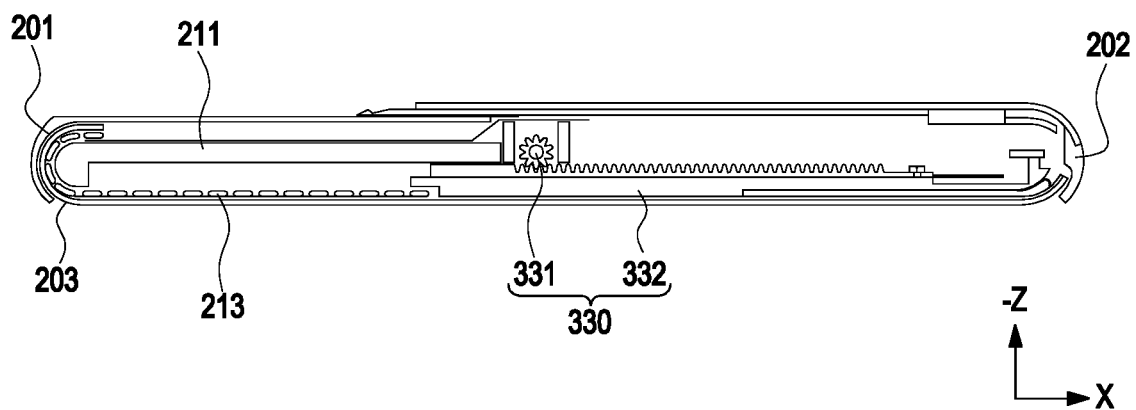
FIG. 6B is a cross-sectional view of the electronic device of FIG. 3 in an expanded position.

FIG. 5 is a front view of the electronic device of FIG. 2 illustrating certain elements disposed below a display constructed according to the principles of the disclosure. FIG. 6A is a cross-sectional view of the electronic device of FIG. 2 in a compact position. FIG. 6B is a cross-sectional view of the electronic device of FIG. 2 in an expanded position.

Referring to FIGS. 5, 6A and/or 6B, an electronic device 101 may include a first housing 201, a second housing 202, a display 203, a first plate 211, a battery 289, a motor module 310, a sensor module 320, and a gear assembly 330. The configuration of the first housing 201, the second housing 202, the display 203, the first plate 211, and the battery 289 of FIGS. 5, 6A and/or 6B may be identical in whole or part to the configuration of the first housing 201, the second housing 202, the display 203, the first plate 211, and the battery 289.

According to various embodiments, as the display 203 connected with the first housing 201 slides in-out with respect to the second housing 202, the display 203 may become occupy a compact such as closed position or an expanded such as open position.

According to various embodiments, a driving structure for automatically or semi-automatically providing a slide in-out movement of the display 203 may be included. For example, when the user presses an open trigger button (e.g., the key input device 241 of FIG. 2) exposed outside the electronic device 101, the display 203 may automatically slide in or out (automatic movement). As another example, when the user slides out the display 203 by pushing the display 203 of the electronic device 101 up to a designated section, for the remaining section, it may be completely slid out by the force of the elastic member mounted in the electronic device 101 (semi-automatic movement). For example, the electronic device 101 may slide out of the compact position (e.g., FIG. 6A) and switch to the expanded position (e.g., FIG. 6B). The slide-in movement of the electronic device 101 may also be performed to correspond to the slide-out movement.

According to various embodiments, the driving structure may include a motor module 310 and a gear assembly 330 configured to move based on the driving of the motor module 310. The slide-out and/or slide-in movement of the electronic device 101 may be performed using the driving structure. For example, the motor module 310 may generate an output, such as torque or rotational force, for the slide-out and/or slide-in movement of the electronic device 101.

According to an embodiment, the motor module 310 may be disposed in the first housing 201. The motor module 310 may be electrically connected with a circuit board (e.g., the circuit board 204 of FIG. 4) and may be controlled by the processor 120 of FIG. 1. For example, the processor 120 may include a motor driver driving circuit and provide a pulse width modulation (PWM) signal to control output of the motor module 310 such as speed and/or torque thereof.

According to an embodiment, the motor module 310 may be connected with a portion (e.g., the pinion gear 331) of the gear assembly 330 to transfer the driving force to the pinion gear 331. According to an embodiment, the motor module 310 may be disposed in parallel with at least a portion of the battery 289 of the display 203. According to an embodiment, the motor module 310 may be connected to the first plate 211.

According to various embodiments, the gear assembly 330 may guide the sliding motion of the first housing 201 and the display 203. According to an embodiment, there may be included a pinion gear 331 connected with the motor module 310 and a rack gear 332 in contact with at least a portion of the pinion gear 331. According to an embodiment, the rack gear 332 may be moved in the sliding direction (e.g., the X-axis direction) of the electronic device by the output of the motor module 310 transferred through the pinion gear 331. According to an embodiment, the pinion gear 331 may be connected to the first housing 201, and the rack gear 332 may be connected to the second housing 202. For example, the pinion gear 331 may be connected to the first plate 211 of the first housing 201 through the motor module 310, and the rack gear 332 may be connected to the second plate 221 of the second housing 202. According to another embodiment, the motor module 310 and/or the pinion gear 331 may be connected to the second housing 202, and the rack gear 332 may be connected to the first housing 201.

According to various embodiments, the sensor module 320 may include a posture detection sensor 321 and a slide distance detection sensor 322.

According to an embodiment, the posture detection sensor 321 may detect the moving direction of the electronic device 101 and an angular velocity of the electronic device 101. For example, the posture detection sensor 321 may detect the degree of freedom (DOF) of the electronic device 101.

According to an embodiment, the posture detection sensor 321 may include an acceleration sensor. The acceleration sensor may be a mechanical acceleration sensor and/or a capacitive acceleration sensor. The mechanical acceleration sensor may detect the resistance changed based on a change in the position of the weight. The capacitive acceleration sensor may detect the capacitance of the moving electrode with respect to the fixed electrode.

According to an embodiment, the posture detection sensor 321 may include a gyro sensor. The gyro sensor may include a micro electro-mechanical systems (MEMS) gyro sensor using the Coriolis effect and/or an optical gyro sensor using the Sagnac effect.

According to an embodiment, the processor 120 may determine the distance between the first housing 201 and the second housing 202 using the slide distance detection sensor 322. According to an embodiment, the slide distance detection sensor 322 may include at least one of a magnetic force sensor (e.g., a Hall sensor), a capacitive sensor, an optical sensor (e.g., a TOF sensor, a dot code detection sensor or an optical encoder), an electromagnetic resonance-type sensor, a resistance-type sensor, or an antenna.

Figure 7:
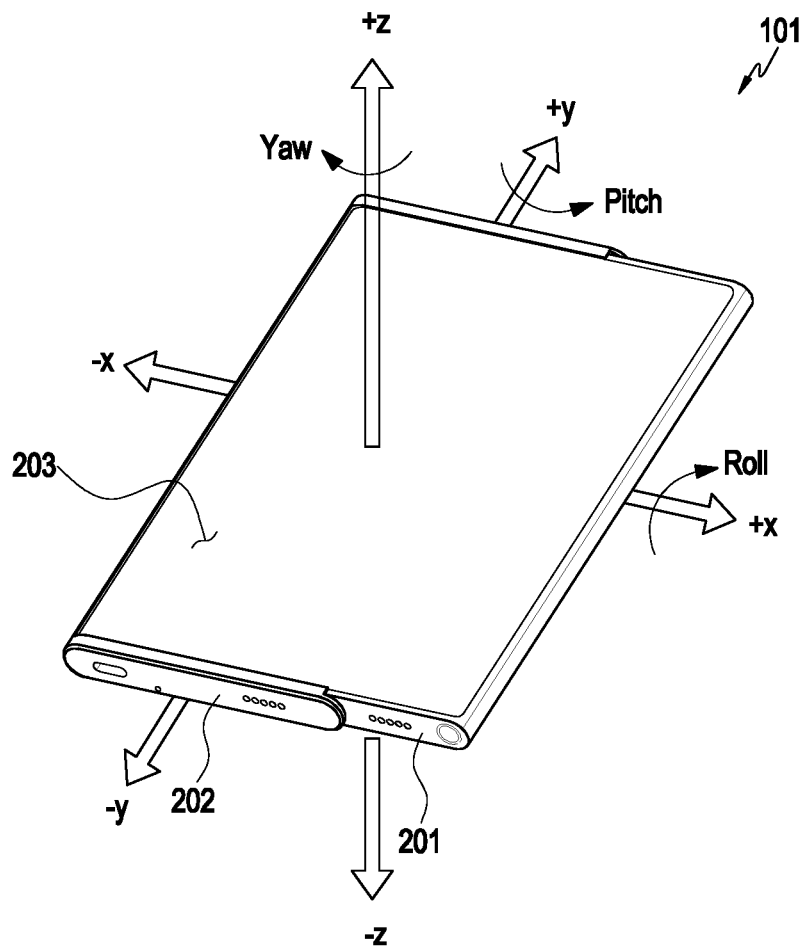
FIG. 7 is a perspective view of the electronic device of FIG. 2 illustrating a posture of the electronic device.
Figure 8:
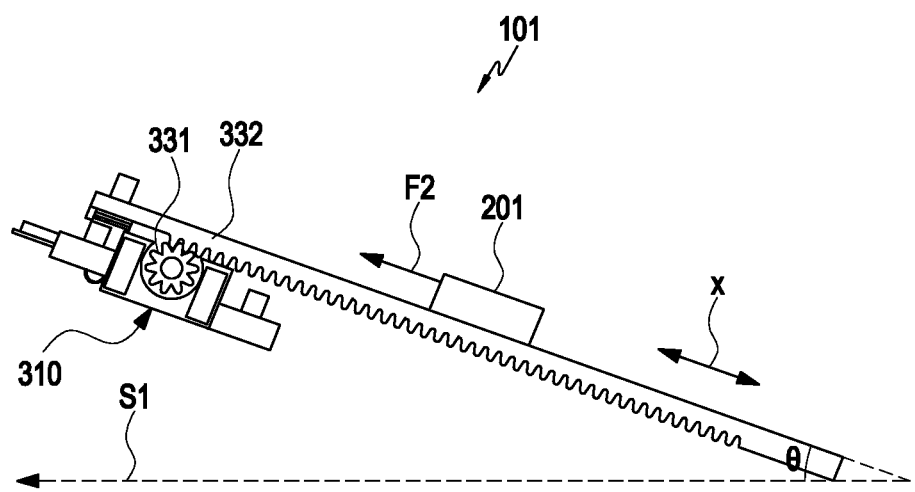
FIG. 8 is a side, elevational view schematically illustrating a driving force to generate linear movement of a first housing with respect to a second housing in connection with a posture of the electronic device.

FIG. 7 is a perspective view of the electronic device of FIG. 2 illustrating a posture of the electronic device. FIG. 8 is a side, elevational view schematically illustrating a driving force to generate linear movement of a first housing with respect to a second housing in connection with a posture of the electronic device.

Referring to FIGS. 7 and 8, the first housing 201 of the electronic device 101 may slide with respect to the second housing 202 using the motor module 310 and the gear assembly 330. The configuration of the first housing 201, the second housing 202, the display 203, the motor module 310, the pinion gear 331 and/or the rack gear 332 of FIGS. 7 and/or 8 may be identical in whole or part to the configuration of the first housing 201, the second housing 202, the display 203, the motor module 310, the pinion gear 331 and/or the rack gear 332 of FIGS. 5, 6A and/or 6B.

According to various embodiments, the processor 120 of FIG. 1 may determine a posture (orientation) of the electronic device 101 using the sensor module 320 of FIG. 5 and/or the posture detection sensor 321. The posture of the electronic device 101 may include or be associated with an Eulerian angle (e.g., roll, yaw, and pitch) of the electronic device 101. For example, the posture of the electronic device 101 may include or be associated with at least one of angles with respect to the width direction (e.g., x-axis direction), length direction (e.g., y-axis direction) and/or thickness direction (e.g., z-axis direction) of the electronic device 101.

According to various embodiments, the processor 120 may determine a first angle θ between the linear direction (x-axis direction) of the electronic device 101 and the ground surface S1 using signals of a sensor module (e.g., the sensor module 320 and/or the posture detection sensor 321 of FIG. 5). The sliding direction may be a direction (e.g., x-axis direction) of the linear movement of the first housing 201 with respect to the second housing 202. The ground surface S1 may be a virtual plane substantially perpendicular to the direction of gravitational acceleration toward the center of the earth (e.g., the center of mass). The first angle θ may be an angle between the sliding direction of the first housing 201 and the ground surface S1.

According to various embodiments, the motor module 310 may generate an output that causes relative movement of the housing parts. For example, due to the output of the motor module 310, the pinion gear 331 may provide torque to the rack gear 332. According to an embodiment, the torque provided by the pinion gear 331 to the rack gear 332 may be proportional to the output of the motor module 310 and the pitch circle diameter of the pinion gear 331 and may be inversely proportional to the efficiency and reduction ratio. As such, the output of the motor module 310 may be converted to a driving force F2 necessary to effect the movement of the first housing 201 relative to the second housing by the pinion gear 331 and the rack gear 332.

According to various embodiments, the magnitude of the driving force F2 required for the linear movement of the first housing 201 may be changed based on the posture of the electronic device 101. For example, the magnitude of the driving force F2 may be changed based on the first angle θ. According to an embodiment, the driving force F2 may meet Equation 1 below.

$$F2 = FA + mg \sin\theta + \mu mg \cos\theta \qquad \text{[Equation 1]}$$

In Equation 1, the basic driving force FA denotes a force for linear movement of the first housing 201 when the first angle θ is 0 degrees. m denotes the mass of the first housing 201, g denotes the gravitational acceleration transferred to the first housing 201, and μ may denotes a friction coefficient between the first housing 201 and the rack gear 332. According to an embodiment, mg sin θ and μmg cos θ may be changed based on the posture (e.g., the first angle θ) of the electronic device 101. mg sin θ denotes a force transferred to the first housing 201 in the downwardly inclined direction (e.g., the sliding direction (x-axis direction)) when the electronic device 101 is inclined at the first angle θ, and μmg cos θ denotes a friction force between the first housing 201 and the rack gear 332 when the electronic device 101 is inclined at the first angle θ. According to an embodiment, as the first angle θ increases with respect to the ground surface S1, the driving force F2 may be increased due to increase of mg sin θ and, as the first angle θ decreases with respect to the ground surface S1, the driving force F2 may be reduced due to decrease of mg sin θ. For example, when the electronic device 101 slides out the first housing 201, the magnitude of the driving force F2 may be the greatest when the first angle θ is 90 degrees and may be the smallest when the first angle θ is −90 degrees. For example, when the electronic device 101 slides in the first housing 201, the magnitude of the driving force F2 may be the smallest when the first angle θ is 90 degrees and may be the greatest when the first angle θ is −90 degrees.

According to various embodiments, the processor 120 may adjust the magnitude of the output of the motor module 310. For example, the processor 120 may change the input current (or input voltage) transferred to the motor module 310.

According to an embodiment, the processor 120 may adjust the output of the motor module 310 based on the posture of the electronic device 101 detected using the sensor module 320. For example, the posture of the electronic device 101 may include the first angle θ, and the processor 120 may adjust the output of the motor module 310 based on the first angle θ. Given that the driving force F2 varies depending on the posture of the electronic device 101, the electronic device 101 may efficiently use the power and/or current for the linear movement by adjusting the output of the motor module 310 depending on the posture of the electronic device 101.

Figure 9:
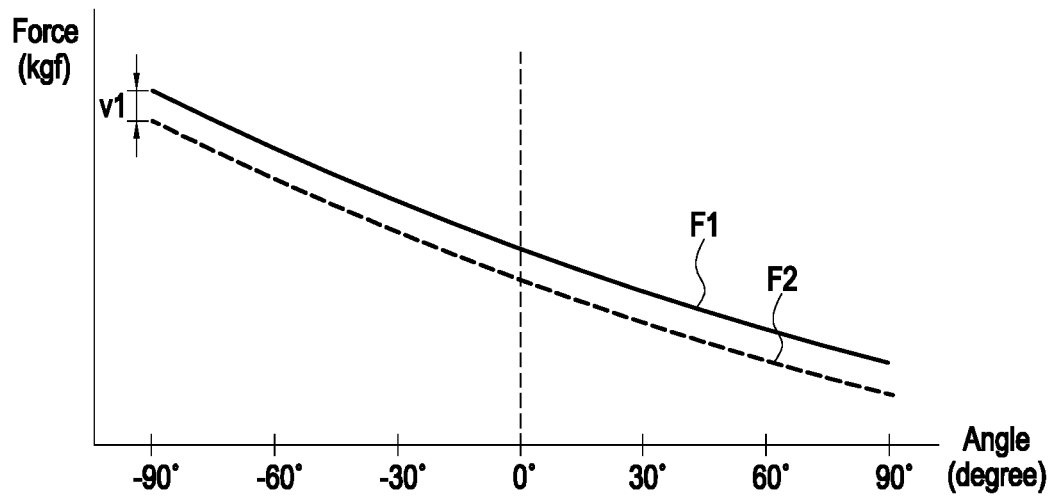
FIGS. 9 and 10 are graphs of embodiments of an output of a motor module and a driving force generating a linear movement of slidable parts of the electronic device.
Figure 10:
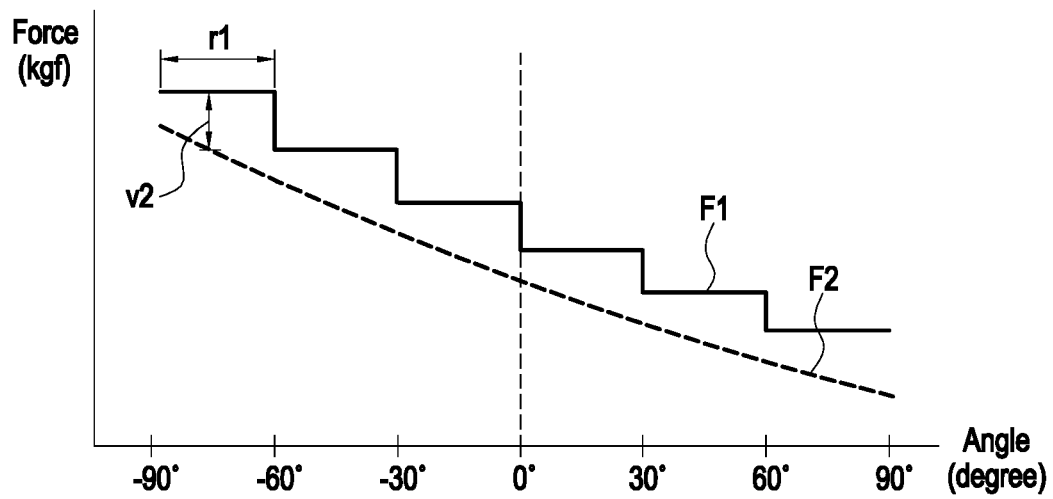

FIGS. 9 and 10 are graphs of embodiments of an output of a motor module and a driving force generating a linear movement of slidable parts of the electronic device.

Referring to FIGS. 9 and 10, the processor 120 of FIG. 1 may adjust the magnitude of the output F1 of the motor module 310 to be equal to or greater than the magnitude of the driving force F2 required for the linear movement of the slide part (e.g., the first housing 210).

According to an embodiment, the processor 120 may adjust the output F1 of the motor module 310 depending on change of the first angle θ in real time as shown in FIG. 9. For example, the processor 120 may set or adjust the output F1 so that the output F1 of the motor module 310 is larger than the driving force F2 by a first designated value v1. The driving force F2 may be changed based on the first angle θ of the first housing 201 with respect to the ground surface S1. According to an embodiment, as the driving force F2 is changed in real time based on the first angle θ, the output F1 may be controlled to be changed in real time based on the first angle θ. The first designated value v1 may be set to various substantially uniform values (e.g., constants). The processor 120 may control the output F1 to be adjusted in real time as shown in FIG. 9 in a first mode or a real-time operation mode.

According to an embodiment, the processor 120 may stepwise adjust the output F1 of the motor module 310 as shown in FIG. 10. According to an embodiment, the processor 120 may set or adjust the output F1 of the motor module 310 so that the output F1 is uniform within each of designated angle ranges r1. For example, the output F1 may be stepwise changed in each of the designated angle ranges r1 of the first angle θ of the electronic device 101 of FIG. 2. The designated angle ranges r1 may be set to various ranges of angles. For example, each of the designated angle ranges r1 may be set to an angle range of about 30 degrees as shown in FIG. 10. As another example, each of the designated angle ranges r1 may be set to an angle range of about 60 degrees. According to an embodiment, the designated angle ranges r1 may be set to various ranges using the user's input. The processor 120 may control the output F1 to be adjusted stepwise as shown in FIG. 10 in a second mode or a stepwise operation mode.

According to an embodiment, the processor 120 may determine the driving force F2 at the point (or time) where the electronic device (e.g., the electronic device 101 of FIG. 2) starts the linear movement using signals of the slide distance detection sensor (e.g., the slide distance detection sensor 322 of FIG. 5). The processor 120 may set the output F1 to be larger than the driving force F2 by a second designated value v2 and to be uniform within the one of the designated angle ranges r1.

Figure 11:
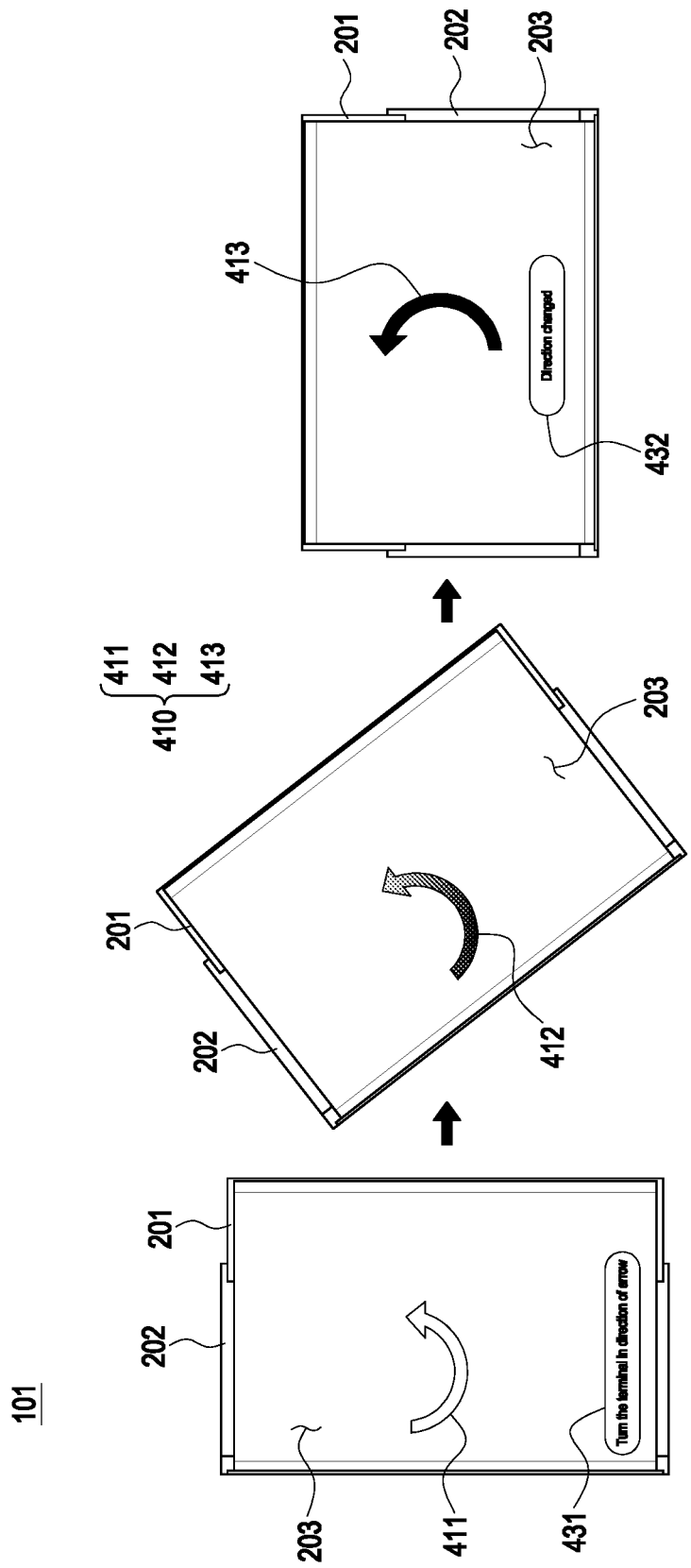
FIG. 11 is a view of an embodiment of the electronic device displaying a guide message for a slide-in movement.
Figure 12:
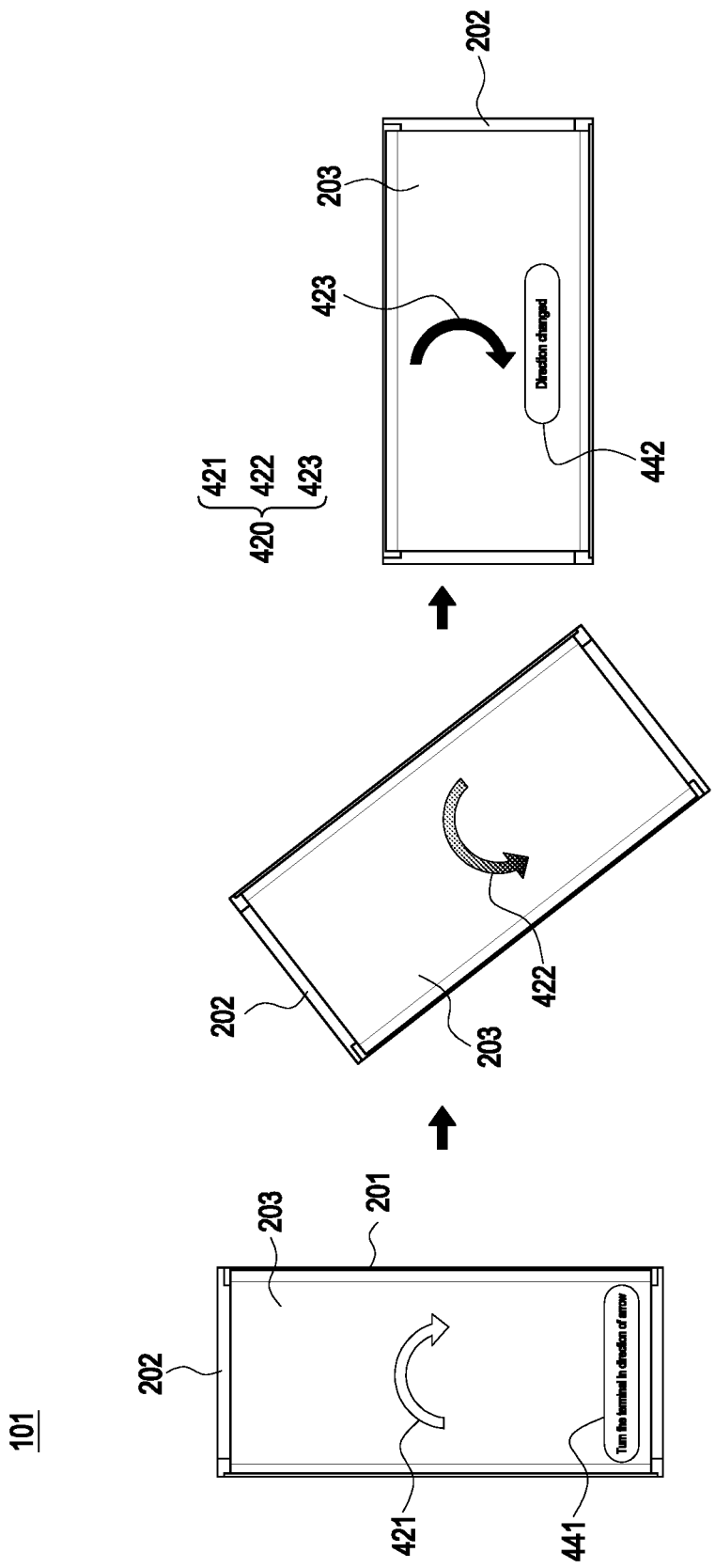
FIG. 12 is a view of an embodiment of the electronic device displaying a guide message for a slide-out movement.
Figure 13:
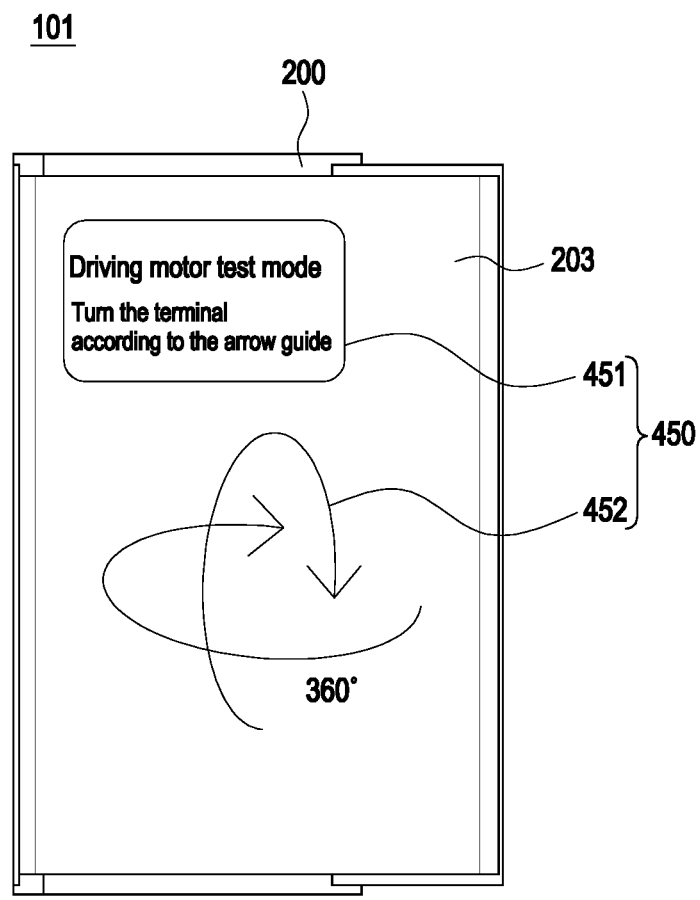
FIG. 13 is a view of an embodiment of the electronic device displaying a guide message for a driving motor test mode.
Figure 14:
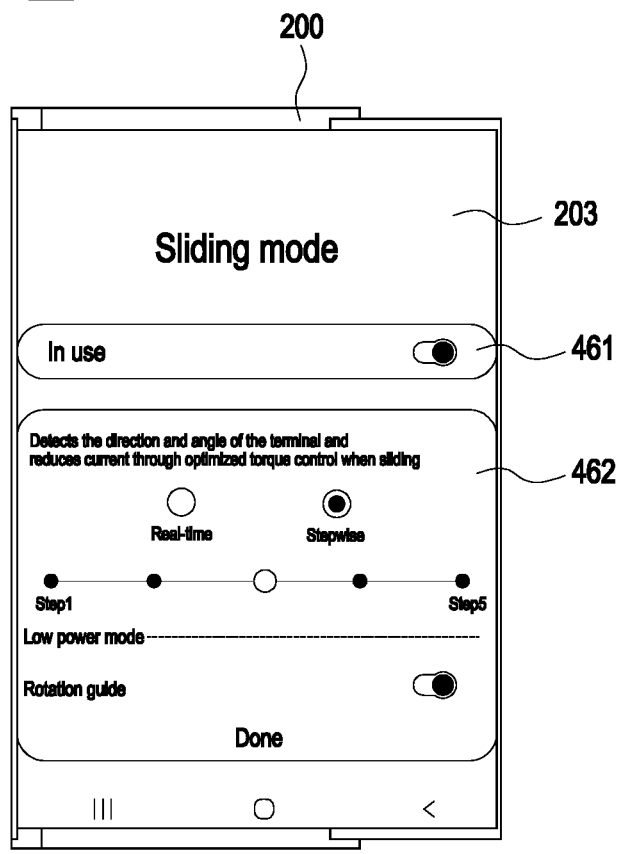
FIG. 14 is a view of an embodiment of the electronic device displaying a first graphical interface to set a sliding mode.

FIG. 11 is a view of an embodiment of the electronic device displaying a guide message for a slide-in movement. FIG. 12 is a view of an embodiment of the electronic device displaying a guide message for a slide-out movement. FIG. 13 is a view of an embodiment of the electronic device displaying a guide message for a driving motor test mode. FIG. 14 is a view of an embodiment of the electronic device displaying a first graphical interface to set a sliding mode.

Referring to FIGS. 11 to 14, the electronic device 101 may provide guide information to the user to facilitate or increase user convenience. The configuration of the housing 200, the first housing 201, the second housing 202, and the display 203 of FIGS. 11, 12, 13 and/or 14 may be identical in whole or part to the configuration of the housing 200, the first housing 201, the second housing 202, and the display 203 of FIG. 3.

According to various embodiments, the electronic device 101 may provide a guide message for reducing power used in the linear movement of the electronic device 101. For example, the electronic device 101 may output a guide message, such as objects, items, texts, etc., for changing the posture of the electronic device 101, using the display 203. According to an embodiment, the processor 120 of FIG. 1 may detect a state of charge of the battery 289 of FIG. 4. When the detected state of charge of the battery 289 is less than or equal to a designated capacity (e.g., 15% or 5%), the processor 120 may output a guide message for guiding to change the posture of the electronic device 101 before driving the motor module 310 of FIG. 5 for the linear movement.

Referring to FIG. 11, the electronic device 101 may output a guide message for reducing the amount of power used in the slide-in movement. Referring to FIG. 12, the electronic device 101 may output a guide message for reducing the amount of power used in the slide-out movement. According to an embodiment, the processor 120 of the electronic device 101 may provide guide messages 410 and 420 for guiding or inducing the rotation of the electronic device 101 to the user.

According to an embodiment, the processor 120 may output, using the display 203, a first guide message 410 for guiding the rotation direction of the electronic device 101 as shown in FIG. 11. The first guide message 410 may be a curved arrow whose shade and/or size is changed based on the posture (e.g., angle) of the electronic device 101. For example, the first guide message 410 may include a 1-1th guide message 411, a 1-2th guide message 412, and a 1-3th guide message 413 in which the shade is changed in real time or stepwise based on the angle or posture of the electronic device 101.

As shown in FIG. 11, the processor 120 may provide the user with the first guide message 410 for allowing the second housing 202 to be positioned further adjacent to the ground surface (e.g., the ground surface S1 of FIG. 8) than the first housing 201 and rotating the electronic device 101 to allow the sliding direction of the electronic device 101 to be substantially perpendicular to the ground surface, before the electronic device 101 in the expanded position performs a slide-in movement.

According to an embodiment, the processor 120 may output, using the display 203, a second guide message 420 for guiding the rotation direction of the electronic device 101 as shown in FIG. 12. The second guide message 420 may be a curved arrow whose shade and/or size is changed based on the posture (e.g., angle) of the electronic device 101. For example, the second guide message 420 may include a 2-1th guide message 421, a 2-2th guide message 422, and a 2-3th guide message 423 in which the shade is changed in real time or stepwise based on the angle or posture of the electronic device 101.

As shown in FIG. 12, the processor 120 may provide the user with the second guide message 420 for allowing the first housing 201 to be positioned further adjacent to the ground surface (e.g., the ground surface S1 of FIG. 8) than the second housing 202 and rotating the electronic device 101 to allow the sliding direction of the electronic device 101 to be substantially perpendicular to the ground surface, before the electronic device 101 in the compact position performs a slide-out movement.

According to an embodiment, the processor 120 may output, using the display 203, third guide messages 431 and 432 shown in FIG. 11 and/or fourth guide messages 441 and 442 shown in FIG. 11 for inducing rotation and stop of the electronic device 101. For example, the processor 120 may provide the user with a 3-1th guide message 431 and/or a 4-1th guide message 441 for guiding the user to start rotation of the electronic device 101, using the display 203. As another example, the processor 120 may include, using the display 203, a 3-2th guide message 432 and/or a 4-2th guide message 442 for inducing the user to stop rotating the electronic device 101.

Referring to FIG. 13, the electronic device 101 may output a fourth guide message 450 to increase the accuracy of the sensor module (e.g., the posture detection sensor 321 of FIG. 5) to detect the posture of the electronic device 101. For example, the electronic device 101 may perform a driving motor test mode to induce the user to rotate the electronic device 101 at various angles with respect to the ground surface (e.g., the ground surface S1 of FIG. 8). According to an embodiment, the processor 120 may output a fifth guide message 450 for inducing rotation of the electronic device 101, using the display 203. The fourth guide message 450 may include a 4-1th guide message 451 for guiding the user about whether to operate in the driving motor test mode and a 5-2th guide message 452 for guiding the user to the rotation direction of the electronic device 101. According to an embodiment, the 5-2th guide message 452 may be a curved arrow for rotating the electronic device 101 at various angles.

Referring to FIG. 14, the electronic device 101 may include a screen including a graphical interface to receive user inputs to set whether the sliding mode is used and/or detailed settings of the sliding mode of the electronic device 101. According to an embodiment, the processor (e.g., the processor 120 of FIG. 1) of the electronic device 101 may display, using the display 203, a first menu object 461 for changing whether to use the sliding mode. According to an embodiment, the electronic device 101 may control whether to operate in the sliding mode based on an input for selecting an icon of the first menu object 461. The sliding mode may be a mode in which the input current and/or the input voltage transferred to the motor module (e.g., the motor module 310 of FIG. 5) is changed based on the posture of the electronic device 101.

According to an embodiment, the processor 120 may include a second menu object 462 for changing the detailed settings of the sliding mode. According to an embodiment, the electronic device 101 may adjust detailed settings of the sliding mode based on an input for selecting an icon of the second menu object 462.

According to an embodiment, the processor 120 may provide the user with the guide messages 410 and 420 of FIGS. 11 and/or 12 when the state of charge of the battery (e.g., the battery 289 of FIG. 4) is less than a designated level based on a user input (e.g., a touch) to the second menu object 462.

According to an embodiment, the processor 120 may adjust the output (e.g., the output F1 of FIG. 9 and/or 10) of the motor module 310 of FIG. 5 based on a user input (e.g., a touch) to the second menu object 462. For example, when receiving an input for a "real-time" icon, the electronic device 101 may operate the motor module 310 in the first mode of FIG. 9. As another example, when receiving an input for a "stepwise" icon, the electronic device 101 may operate the motor module 310 in the second mode of FIG. 10. According to an embodiment, the electronic device 101 may adjust each angle range (e.g., the designated angle range r1 of FIG. 10) of the output F1 based on the step selection.

According to an embodiment, the processor 120 may provide the user with the rotation guide (e.g., driving motor test mode) of FIG. 13 based on a user input (e.g., a touch) to the second menu object 462.

Figure 15:
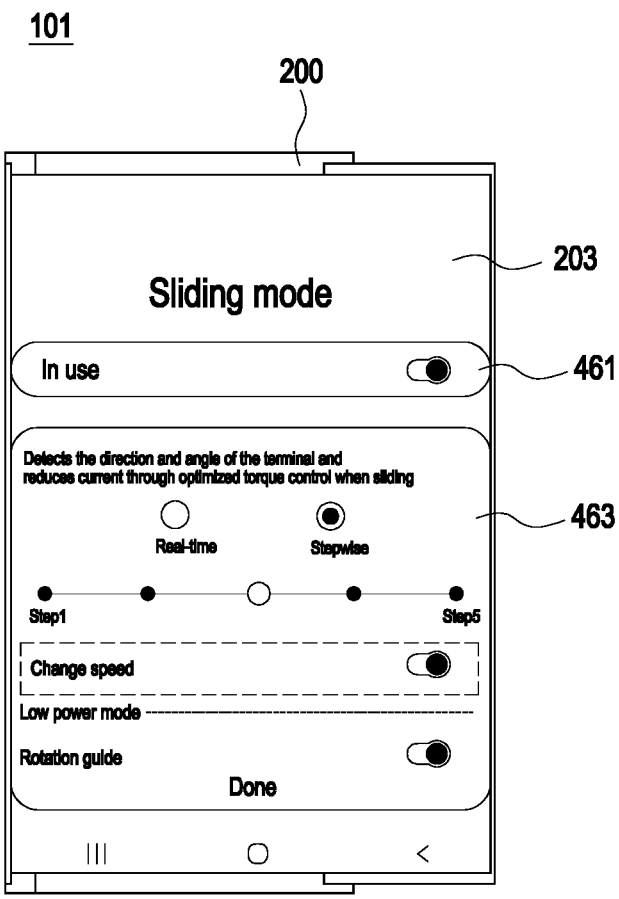
FIG. 15 is a view of an embodiment of the electronic device displaying a second graphical interface to further set a slide speed of the sliding mode.
Figure 16A:
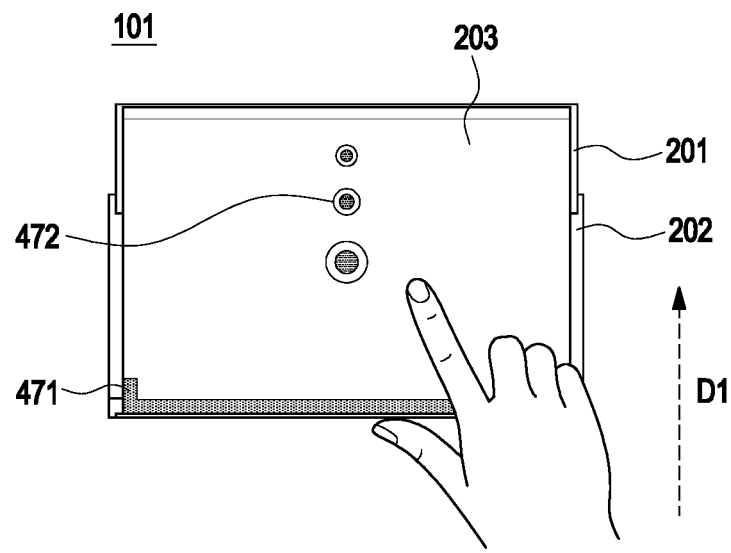
FIGS. 16A and 16B are views of an embodiment of the electronic device displaying objects visually showing a slide speed.
Figure 16B:
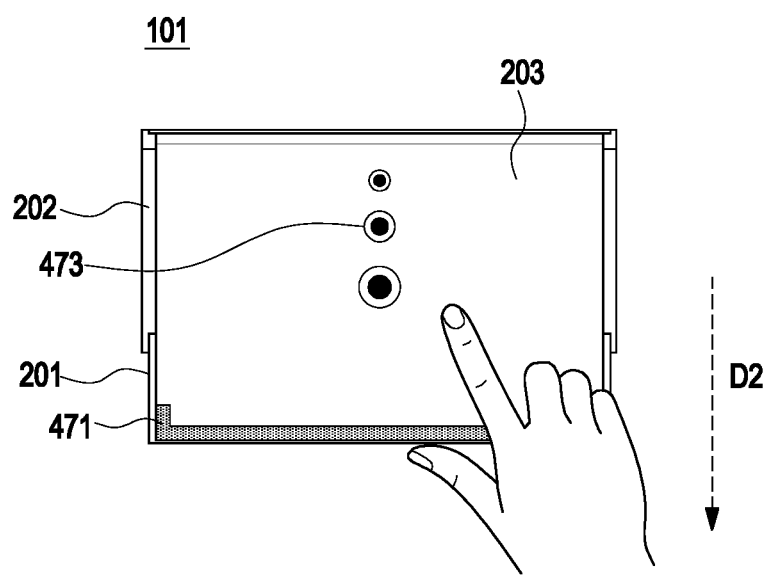

FIG. 15 is a view of an embodiment of the electronic device displaying a second graphical interface to further set a slide speed of the sliding mode. FIGS. 16A and 16B are views of an embodiment of the electronic device displaying objects visually showing a slide speed.

Referring to FIGS. 15 to 16B, the electronic device 101 may change the speed of the sliding movement. For example, the processor 120 of FIG. 1 of the electronic device 101 may adjust the input current and/or the input voltage transferred to the motor module 310 of FIG. 5, changing the speed of the first housing 201 with respect to the second housing 202. The configuration of the housing 200, the first housing 201, the second housing 202, and the display 203 of FIGS. 15, 16A, and/or 16B may be identical in whole or part to the configuration of the housing 200, the first housing 201, the second housing 202, and the display 203 of FIG. 3.

Referring to FIG. 15, the electronic device 101 may include a screen including a graphical interface to receive user inputs for detailed settings of the sliding mode of the electronic device 101.

According to an embodiment, the processor 120 may include a third menu object 463 for changing the detailed settings of the sliding mode. According to an embodiment, the electronic device 101 may adjust detailed settings of the sliding mode based on an input for selecting an icon of the third menu object 463.

According to an embodiment, the processor 120 may adjust whether to change the slide speed of the electronic device 101 based on a user input (e.g., a touch) to the third menu object 463.

According to an embodiment, when the electronic device 101 receives an input selecting "speed change" icon, the electronic device 101 may change the slide speed of the housing 200. For example, the processor 120 may change the torque of the motor module 310 and the slide speed of the first housing 201 with respect to the second housing 202 based on the magnitude of the current transferred to the motor module 310.

According to an embodiment, when the electronic device 101 receives an input unselecting the "speed change" icon, the electronic device 101 may maintain the slide speed constant. For example, the processor 120 may maintain the slide speed of the electronic device 101 constant. For example, the processor 120 may change the torque of the motor module 310 while maintaining the same rotation speed of the motor module 310. When the magnitude of the current transferred to the motor module 310 is increased while the slide speed is constant, the torque of the motor module 310 may be increased.

According to various embodiments, the electronic device 101 may provide a 7-1th guide message 471 for indicating the direction of gravity with respect to the electronic device 101. According to an embodiment, the color and/or the shade of the 7-1th guide message 471 may be changed based on the posture of the electronic device 101. According to an embodiment, the processor 120 may display the 7-1th guide message 471 on a portion of the display 203 in the direction of gravity. The user may determine the direction of gravity with respect to the electronic device 101 based on the 7-1th guide message 471. For example, the direction in which the 7-1th guide message 471 is positioned may be determined as the direction of gravity.

According to an embodiment, when the sliding direction of the electronic device 101 is the same as the gravity direction, current used in the sliding movement of the electronic device 101 may be reduced or the speed of the sliding movement of the electronic device 101 may be increased. For example, the slide speed of the electronic device 101 of FIG. 16B in which the second sliding direction D2 of the first housing 201 with respect to the second housing 202 is the same as the direction of gravity may be larger than the slide speed of the electronic device 101 of FIG. 16A in which the first sliding direction D1 of the first housing 201 with respect to the second housing 202 is different from the direction of gravity.

According to various embodiments, the electronic device 101 may provide a 7-2th guide message 472 and/or a 7-3th guide message 473 to visually show the slide speed of the first housing 201 with respect to the second housing 202. For example, the processor 120 may display, using the display 203, a guide message (e.g., the 7-2th guide message 472 and/or the 7-3th guide message 473) in which the shade, size, and number are changed based on the posture of the electronic device 101. According to an embodiment, the color of the 7-3th guide message 473 in a position (e.g., FIG. 16B) in which the sliding direction D2 of the electronic device 101 and the direction of gravity are substantially the same may be darker than the color of the 7-2th guide message 472 in a position (e.g., FIG. 16A) in which the sliding direction D1 of the electronic device 101 and the direction of gravity are different from each other. According to an embodiment, the processor 120 may adjust the slide speed of the housings 201 and 202 based on a user input (e.g., a gesture) received by the electronic device 101. For example, the processor 120 may determine a swipe, zoom-in, and/or zoom-out gesture input to the display 203 and may adjust the speed of the housing 201 and 202 based on the gesture.

Figure 17:
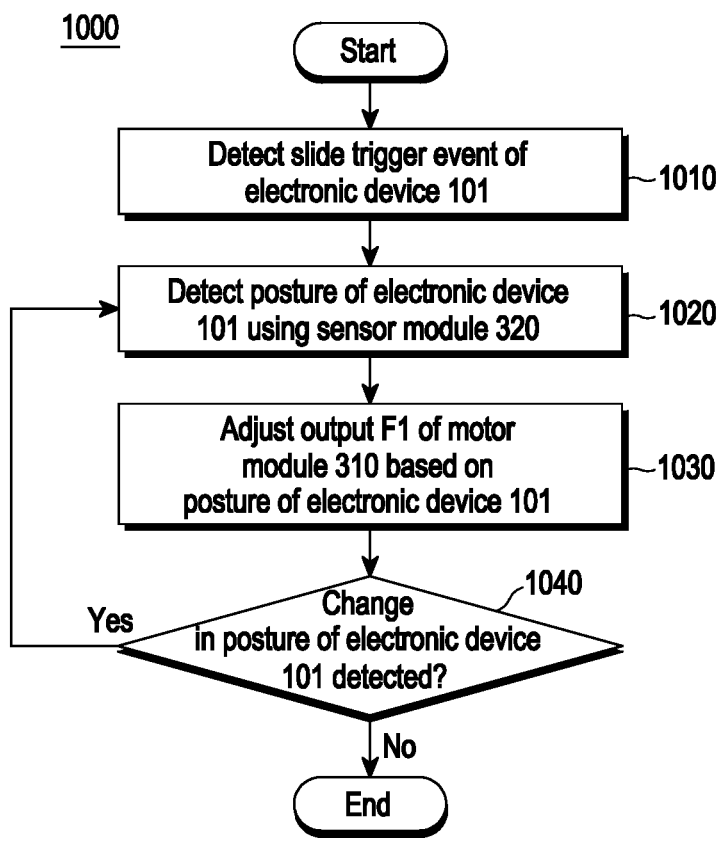
FIG. 17 is a flowchart of an embodiment of a method of controlling relative movement of parts of an electronic device according to the principles of the disclosure.

FIG. 17 is a flowchart of an embodiment of a method of controlling relative movement of parts of an electronic device according to the principles of the disclosure.

Referring to FIG. 17 together with FIG. 5, a method of controlling relative movement, such as a linear sliding movement of parts of an electronic device 101 may include an operation 1010 of detecting a slide trigger event of the electronic device 101, an operation 1020 of detecting a posture of the electronic device 101 using the sensor module 320, an operation 1030 of adjusting the output F1 of the motor module 310 based on the posture of the electronic device 101, and an operation 1040 of detecting a change in the posture of the electronic device 101.

The configuration of the electronic device 101, the motor module 310, and the sensor module 320 of FIG. 17 may be identical in whole or part to the configuration of the electronic device 101, the motor module 310, and the sensor module 320 of FIG. 5. The configuration of the output F1 of FIG. 17 may be identical in whole or part to the configuration of the output F1 of FIG. 9 and/or FIG. 10.

According to an embodiment, the electronic device 101 (or the processor 120 of FIG. 1) may detect the slide trigger event of the electronic device 101 using the sensor module 320. The slide trigger event may be provided by a user input detected using a key input device (e.g., the key input device 241 of FIGS. 2 and 3), an audio module (e.g., the audio module 247a or 247b of FIGS. 2 and 3), and/or a display (e.g., the display 203 of FIG. 2). According to an embodiment, the slide trigger event may be an operation and/or a signal to start a slide-out movement of the electronic device 101 and/or an operation and/or a signal to start a slide-in movement of the electronic device 101. According to an embodiment, in response to detection of the slide trigger event of the electronic device 101, the electronic device 101 may detect the posture of the electronic device 101 using the sensor module 320.

According to an embodiment, the electronic device 101 may perform the operation 1020 of detecting the posture of the electronic device 101 using the sensor module 320. For example, the sensor module 320 may include at least one posture detection sensor (e.g., the posture detection sensor 321 of FIG. 5) including an acceleration sensor and/or a gyro sensor. The posture detection sensor 321 may detect the angle of the electronic device 101 with respect to the ground surface. According to an embodiment, the sensor module 320 may include a pressure sensor. The processor 120 may determine the altitude of the electronic device 101 based on the pressure detected by the pressure sensor. The processor 120 may determine the posture of the electronic device 101 by further considering the altitude of the electronic device 101. According to an embodiment, the sensor module 320 may include a geomagnetic sensor. The processor 120 may determine the posture of the electronic device 101 by further considering the magnetic field detected by the geomagnetic sensor.

According to an embodiment, the electronic device 101 may perform the operation 1030 of adjusting the output F1 of the motor module 310 based on the posture of the electronic device 101. For example, based on the posture of the electronic device 101, the magnitude of the driving force (e.g., the driving force F2 of FIG. 9 and/or FIG. 10) required in the sliding movement of the electronic device 101 may be changed, and the output F1 may be adjusted to be larger than the driving force F2. For example, the minimum driving force of the electronic device 101 (e.g., the driving force in a position in which the first housing 201 slides out toward the ground surface (e.g., the ground surface S1 in FIG. 8)) may be smaller by 100 kgf to 150 kgf, than the maximum driving force of the electronic device 101 (e.g., the driving force in a position in which the first housing 201 slides in in a vertical direction to move away from the ground surface S1). According to an embodiment, the processor 120 may include a motor driving circuit to change the input current and/or input voltage transferred to the motor module 310 to adjust the output F1. For example, the current used to generate the output F1 corresponding to the minimum driving force may be 10% to 15% less than the current used to generate the output F1 corresponding to the maximum driving force.

According to an embodiment, the electronic device 101 may perform the operation 1040 of detecting a change in the posture of the electronic device 101. According to an embodiment, when the change in the posture of the electronic device 101 is detected during the sliding movement of the electronic device 101, the processor 120 may perform operations 1020 and 1030 again. According to an embodiment, when the change in the posture of the electronic device 101 is not detected during the sliding movement of the electronic device 101, the processor 120 may maintain output F1 and may terminate the sliding movement of the electronic device 101 until, for example, the electronic device 101 is in the expanded position. According to an embodiment, step 1040 of detecting a change in the posture of the electronic device 101 may determine the posture of the electronic device 101 in real time. According to an embodiment, the processor 120 may determine whether the electronic device 101 is positioned within a designated angle range and, if it is within the designated angle range, determine that the posture is not changed.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
a housing including a first housing and a second housing, wherein the second housing is configured to receive at least a portion of the first and to guide a linear movement of the first housing with respect to the second housing;
a display configured to move between a compact position and an extended position based on the linear movement;
a motor configured to output a force to cause the linear movement;
a sensor configured to detect a posture of the electronic device;
at least one processor; and
memory storing instructions configured to, when executed by the at least one processor, cause the electronic device to:
identify the posture of the electronic device by the sensor, change the force of the motor based on the identified posture, wherein the identified posture is based on an angle between a direction of the linear movement and a direction of gravitational acceleration.

2. The electronic device of claim 1, wherein the sensor comprises a posture detection sensor including i) at least one of an acceleration sensor and a gyro sensor, or ii) at least one of a geomagnetic sensor or a pressure sensor.

3. The electronic device of claim 1, wherein the at least one processor is configured to determine an angle between the direction of the linear movement and the ground plane using the sensor and to control an input current or an input voltage transferred to the motor based on the angle to change the output force of the motor.

4. The electronic device of claim 1, wherein the motor is disposed in the first housing and further comprising a gear assembly connected to the motor and including a pinion gear disposed in the first housing and a rack gear connected to the second housing.

5. The electronic device of claim 1, wherein the at least one processor is configured to determine a driving force necessary to effect the linear movement of the housing based on the posture detected using the sensor, and
wherein the output force is set to be larger than the driving force.

6. The electronic device of claim 5, wherein the output force is set to be larger than the driving force by an uniform designated value, and
wherein the output force is adjusted in real time based on the posture.

7. The electronic device of claim 5, wherein the at least one processor is configured to uniformly control the output force within at least one of designated ranges of the posture, and
wherein the output force is adjusted stepwise in the designated ranges.

8. The electronic device of claim 7, wherein the sensor comprises a distance detection sensor to detect the relative linear movement, and
wherein the at least one processor is configured to determine the driving force at a point where the linear movement starts using the distance detection sensor and control the output force to be larger than the driving force by a designated value and uniform within one of the designated ranges.

9. The electronic device of claim 1, wherein the at least one processor comprises a motor driver driving circuit to adjust an operation of the motor.

10. The electronic device of claim 1, wherein the at least one processor is configured to adjust torque of the motor while controlling the motor to maintain the same rotation speed.

11. The electronic device of claim 1, further comprising:
a battery to supply power to the motor and the at least one processor,
wherein the at least one processor is configured to output, using the display, a guide message for changing the posture of the electronic device when a state of charge of the battery is less than a designated level.

12. The electronic device of claim 11, wherein the at least one processor is configured to generate signals to:
before moving the first housing into the second housing, output a first guide message to allow the second housing to be positioned further adjacent to a ground surface than the first housing and rotate the electronic device to allow a direction of the linear movement to be perpendicular to the ground surface; and
before moving the first housing out of the second housing, output a second guide message to allow the first housing to be positioned further adjacent to the ground surface than the second housing and rotate the electronic device to allow the direction of the linear movement to be perpendicular to the ground surface.

13. The electronic device of claim 1, wherein the at least one processor is configured to output, using the display, at least one guide message to induce rotation of the electronic device to increase accuracy of the sensor of the electronic device.

14. The electronic device of claim 1, wherein the first housing comprises a slide housing and the second housing comprises a main housing; and
the display comprises a rollable display configured to be rolled or unrolled into the compact or expanded positions.

15. The electronic device of claim 1, further comprising a multi-bar structure supporting at least a portion of the display.

16. A method for controlling a motor of an electronic device including a housing including a first housing and a second housing, wherein the second housing is configured to receive at least a portion of the first housing and to guide a linear movement of the first housing with respect to the second housing, a display configured to move between the compact position and an extended position based on the linear movement and a motor configured to output a force to cause the liner movement, the method comprising the operations of:
identifying a posture of the electronic device using a sensor; and
changing an output force of the motor based on an angle between a direction of the linear movement and a direction of gravitational acceleration.

17. The method of claim 16, wherein the operation of identifying the posture comprises determining an angle between the direction of the linear movement and a ground surface using the sensor, and
wherein the operation of changing the output force comprises changing an input current or an input voltage transferred to the motor based on the angle to change the output force.

18. The method of claim 16, wherein the step-operation of changing the output force comprises the operations of:
determining a driving force necessary to move the one portion based on the posture detected using the sensor, and
adjusting the output force to be larger than the driving force.

19. The method of claim 16, further comprising the operation of detecting a slide trigger event of the electronic device.

20. The method of claim 16, wherein the operation of changing the output force comprises at least one of i) controlling the output force to be uniform within a designated range of the identified posture, and ii) changing the output force stepwise in the designated range.

* * * * *